United States Patent
Savage et al.

(10) Patent No.: US 11,538,064 B2
(45) Date of Patent: Dec. 27, 2022

(54) SYSTEM AND METHOD OF PROVIDING A PLATFORM FOR MANAGING DATA CONTENT CAMPAIGN ON SOCIAL NETWORKS

(71) Applicant: Khoros, LLC, Austin, TX (US)

(72) Inventors: Allison Savage, Austin, TX (US); Morten Moeller, Austin, TX (US); Phu Nguyen, Austin, TX (US); Gouning Hu, Fremont, CA (US); Nemanja Spasojevic, San Francisco, CA (US)

(73) Assignee: Khoros, LLC, Austin, TX (US)

( * ) Notice: Subject to any disclaimer, the term of this patent is extended or adjusted under 35 U.S.C. 154(b) by 14 days.

(21) Appl. No.: 16/952,038

(22) Filed: Nov. 18, 2020

(65) Prior Publication Data

US 2021/0174391 A1    Jun. 10, 2021

Related U.S. Application Data

(63) Continuation of application No. 15/581,795, filed on Apr. 28, 2017, now Pat. No. 10,902,462.

(51) Int. Cl.
*G06Q 30/02* (2012.01)
*G06N 20/00* (2019.01)
(Continued)

(52) U.S. Cl.
CPC ......... *G06Q 30/0255* (2013.01); *G06N 5/022* (2013.01); *G06N 20/00* (2019.01);
(Continued)

(58) Field of Classification Search
CPC . G06Q 50/01; G06Q 30/0276; G06F 16/9535
See application file for complete search history.

(56) References Cited

U.S. PATENT DOCUMENTS

| 6,041,311 A | 3/2000 | Chislenko et al. |
| 6,146,026 A | 11/2000 | Ushiku |

(Continued)

FOREIGN PATENT DOCUMENTS

| CN | 102054033 A | 5/2011 |
| CN | 103177095 B | 12/2015 |

(Continued)

OTHER PUBLICATIONS

Antoniades et al., "we.b: The web of short URLs," Apr. 2011, Proceedings of the 20th International Conference on World Wide Web, Mar. 28, 2011-Apr. 1, 2011, Hyderabad, India, pp. 715-724 (Year: 2011).

(Continued)

*Primary Examiner* — Saba Dagnew
(74) *Attorney, Agent, or Firm* — Kokka & Backus, PC

(57) ABSTRACT

A computer-implemented system including a data store: a content items database, a user account database, and one or more servers configured to execute a computer program to perform one or more of the following: receiving content items from content database that are associated with a topic selected by a user for posting on a social network, wherein at least one content item is associated with an URL; estimating a post to a reaction filter for a time interval for the social network for the user, calculating a reaction profile associated with reactions to posts on the social network by aggregating reaction time of a plurality of users on the social network for one or more content items posted on the social network; determining a schedule for posting the content items on the social network as a function of the post to reaction filter and reaction profile.

20 Claims, 17 Drawing Sheets

(51) Int. Cl.

| | | |
|---|---|---|
| *G06N 5/02* | (2006.01) | |
| *H04L 51/52* | (2022.01) | |
| *H04L 67/55* | (2022.01) | |
| *G06N 7/00* | (2006.01) | |
| *H04L 51/21* | (2022.01) | |
| *G06Q 50/00* | (2012.01) | |
| *G06N 5/00* | (2006.01) | |
| *H04L 51/214* | (2022.01) | |

(52) U.S. Cl.
CPC ..... *G06Q 30/0201* (2013.01); *G06Q 30/0244* (2013.01); *G06Q 50/01* (2013.01); *H04L 51/52* (2022.05); *H04L 67/55* (2022.05); *G06N 5/003* (2013.01); *G06N 7/005* (2013.01); *H04L 51/214* (2022.05)

(56) References Cited

U.S. PATENT DOCUMENTS

| | | | |
|---|---|---|---|
| 6,385,611 | B1 | 5/2002 | Cardona |
| 6,684,239 | B1 | 1/2004 | Flepp et al. |
| 6,742,032 | B1 | 5/2004 | Castellani et al. |
| 6,871,232 | B2 | 3/2005 | Curie et al. |
| 7,031,952 | B1 | 4/2006 | Heumann et al. |
| 7,032,030 | B1 | 4/2006 | Codignotto |
| 7,222,156 | B2 | 5/2007 | Gupta et al. |
| 7,409,710 | B1 | 8/2008 | Uchil et al. |
| 7,590,636 | B1 | 9/2009 | Heumann et al. |
| 7,606,865 | B2 | 10/2009 | Kumar et al. |
| 7,644,057 | B2 | 1/2010 | Nelken et al. |
| 7,702,541 | B2 | 4/2010 | Black et al. |
| 7,725,492 | B2 | 5/2010 | Sittig et al. |
| 7,751,620 | B1 | 7/2010 | Cosoi |
| 7,756,926 | B2 | 7/2010 | Tseng et al. |
| 7,792,948 | B2 | 9/2010 | Zhao et al. |
| 7,818,758 | B2 | 10/2010 | Bonet et al. |
| 7,831,912 | B2 | 11/2010 | King et al. |
| 7,853,565 | B1 | 12/2010 | Liskov |
| 7,979,369 | B2 | 7/2011 | Grenier et al. |
| 8,006,187 | B1 | 8/2011 | Bailey et al. |
| 8,027,931 | B2 | 9/2011 | Kalaboukis |
| 8,082,308 | B1 | 12/2011 | Filev |
| 8,131,745 | B1 | 3/2012 | Hoffman et al. |
| 8,171,128 | B2 | 5/2012 | Zuckerberg et al. |
| 8,200,527 | B1 | 6/2012 | Thompson et al. |
| 8,225,376 | B2 | 7/2012 | Zuckerberg et al. |
| 8,286,154 | B2 | 10/2012 | Kaakani et al. |
| 8,321,300 | B1 | 11/2012 | Bockius et al. |
| 8,386,509 | B1 * | 2/2013 | Scofield ............. G06F 16/9535 707/706 |
| 8,412,657 | B2 | 4/2013 | Grenier et al. |
| 8,437,369 | B2 | 5/2013 | Shaikli |
| 8,505,069 | B1 | 8/2013 | Solodovnikov et al. |
| 8,606,792 | B1 | 12/2013 | Jackson et al. |
| 8,615,442 | B1 | 12/2013 | Kapur et al. |
| 8,744,937 | B2 | 6/2014 | Seubert et al. |
| 8,752,041 | B2 | 6/2014 | Akiyoshi et al. |
| 8,769,417 | B1 | 7/2014 | Robinson et al. |
| 8,813,125 | B2 | 8/2014 | Reisman |
| 8,825,515 | B1 | 9/2014 | Hanson |
| 8,886,580 | B2 | 11/2014 | Grenier et al. |
| 8,892,524 | B1 | 11/2014 | Lee et al. |
| 8,943,069 | B2 | 1/2015 | Heumann et al. |
| 8,972,428 | B2 | 3/2015 | Dicker et al. |
| 9,021,361 | B1 | 4/2015 | Pettinati et al. |
| 9,105,044 | B2 | 8/2015 | Wu |
| 9,131,382 | B1 | 9/2015 | Johns |
| 9,141,997 | B2 | 9/2015 | Gaedcke et al. |
| 9,143,478 | B2 | 9/2015 | Ramaswamy |
| 9,229,702 | B1 | 1/2016 | Kapulkin et al. |
| 9,251,360 | B2 | 2/2016 | Meyer et al. |
| 9,256,826 | B2 * | 2/2016 | Srinivasan ............. G06N 20/00 |
| 9,282,098 | B1 | 3/2016 | Hitchcock et al. |
| 9,286,102 | B1 | 3/2016 | Harel et al. |
| 9,311,683 | B1 | 4/2016 | Saylor et al. |
| 9,325,696 | B1 | 4/2016 | Balfanz et al. |
| 9,338,186 | B2 | 5/2016 | Wollenstein et al. |
| 9,369,454 | B2 | 6/2016 | Porzio et al. |
| 9,378,295 | B1 | 6/2016 | Marra et al. |
| 9,483,802 | B2 | 11/2016 | Gaedcke et al. |
| 9,501,746 | B2 | 11/2016 | Prakash |
| 9,509,742 | B2 | 11/2016 | Gordon |
| 9,514,459 | B1 | 12/2016 | Doshi et al. |
| 9,519,723 | B2 | 12/2016 | Lorenz et al. |
| 9,596,206 | B2 | 3/2017 | Bueno et al. |
| 9,619,531 | B2 | 4/2017 | Wu |
| 9,654,450 | B2 | 5/2017 | Ford et al. |
| 9,710,567 | B1 * | 7/2017 | Lobdell ............... G06F 16/9535 |
| 9,756,098 | B2 | 9/2017 | Kazerani et al. |
| 9,787,664 | B1 | 10/2017 | Subbiah et al. |
| 9,800,639 | B2 | 10/2017 | Gordon |
| 9,953,063 | B2 | 4/2018 | Spasojevic et al. |
| 10,084,838 | B2 | 9/2018 | Gordon et al. |
| 10,142,386 | B2 | 11/2018 | Gordon |
| 10,178,173 | B2 | 1/2019 | Kadowaki et al. |
| 10,180,971 | B2 | 1/2019 | Bhave et al. |
| 10,188,905 | B2 | 1/2019 | Dohlen |
| 10,204,344 | B2 | 2/2019 | Gaedcke et al. |
| 10,204,383 | B2 | 2/2019 | Gaedcke et al. |
| 10,264,042 | B2 | 4/2019 | Gordon |
| 10,264,073 | B2 | 4/2019 | Kadowaki et al. |
| 10,284,723 | B1 | 5/2019 | Neuer, III et al. |
| 10,346,449 | B2 | 7/2019 | Senftleber et al. |
| 10,417,180 | B1 | 9/2019 | Patwardhan |
| 10,430,894 | B2 | 10/2019 | Wu |
| 10,489,866 | B2 | 11/2019 | Gaedcke et al. |
| 10,491,490 | B2 | 11/2019 | Sridhar et al. |
| 10,497,069 | B2 | 12/2019 | Gaedcke et al. |
| 10,594,773 | B2 | 3/2020 | Falcao et al. |
| 10,601,937 | B2 | 3/2020 | Holzband et al. |
| 10,785,222 | B2 | 9/2020 | Senftleber et al. |
| 10,855,657 | B2 | 12/2020 | Senftleber et al. |
| 10,867,131 | B2 | 12/2020 | Scott et al. |
| 10,902,462 | B2 | 1/2021 | Savage et al. |
| 10,931,540 | B2 | 2/2021 | Davis et al. |
| 10,956,459 | B2 | 3/2021 | Senftleber et al. |
| 10,999,278 | B2 | 5/2021 | Senftleber et al. |
| 11,050,704 | B2 | 6/2021 | Senftleber et al. |
| 11,061,900 | B2 | 7/2021 | Falcao et al. |
| 2001/0025253 | A1 | 9/2001 | Heintz et al. |
| 2001/0037469 | A1 | 11/2001 | Gupta et al. |
| 2001/0042087 | A1 | 11/2001 | Kephart et al. |
| 2001/0047290 | A1 | 11/2001 | Petras et al. |
| 2002/0010746 | A1 | 1/2002 | Jilk et al. |
| 2002/0049793 | A1 | 4/2002 | Okumura et al. |
| 2002/0070953 | A1 | 6/2002 | Barg et al. |
| 2002/0105545 | A1 | 8/2002 | Carter et al. |
| 2002/0144156 | A1 | 10/2002 | Copeland |
| 2003/0005103 | A1 | 1/2003 | Narad et al. |
| 2003/0028525 | A1 | 2/2003 | Santos et al. |
| 2003/0078959 | A1 | 4/2003 | Yeung et al. |
| 2003/0128203 | A1 | 7/2003 | Marshall et al. |
| 2003/0135565 | A1 | 7/2003 | Estrada |
| 2003/0187871 | A1 | 10/2003 | Amano et al. |
| 2003/0225850 | A1 | 12/2003 | Teague |
| 2004/0049673 | A1 | 3/2004 | Song et al. |
| 2004/0073666 | A1 | 4/2004 | Foster et al. |
| 2004/0133697 | A1 | 7/2004 | Mamaghani et al. |
| 2004/0174397 | A1 | 9/2004 | Cereghini et al. |
| 2005/0060643 | A1 | 3/2005 | Glass et al. |
| 2005/0074126 | A1 | 4/2005 | Stanko |
| 2005/0132348 | A1 | 6/2005 | Meulemans et al. |
| 2005/0206644 | A1 | 9/2005 | Kincaid |
| 2005/0283614 | A1 | 12/2005 | Hardt |
| 2006/0010215 | A1 | 1/2006 | Clegg et al. |
| 2006/0036685 | A1 | 2/2006 | Canning et al. |
| 2006/0129602 | A1 | 6/2006 | Witriol et al. |
| 2006/0143307 | A1 | 6/2006 | Codignotto |
| 2006/0155581 | A1 | 7/2006 | Eisenberger et al. |
| 2006/0185021 | A1 | 8/2006 | Dujari et al. |
| 2006/0206578 | A1 | 9/2006 | Heidloff et al. |
| 2006/0294196 | A1 | 12/2006 | Feirouz et al. |
| 2007/0083536 | A1 | 4/2007 | Darnell et al. |

(56) References Cited

U.S. PATENT DOCUMENTS

| | | |
|---|---|---|
| 2007/0118889 A1 | 5/2007 | Fredell |
| 2007/0136354 A1 | 6/2007 | Chen |
| 2007/0171716 A1 | 7/2007 | Wright et al. |
| 2007/0226177 A1 | 9/2007 | Barsness et al. |
| 2007/0240119 A1 | 10/2007 | Ducheneaut et al. |
| 2007/0282800 A1 | 12/2007 | England et al. |
| 2007/0286528 A1 | 12/2007 | Podilchuk |
| 2007/0289006 A1 | 12/2007 | Ramachandran et al. |
| 2008/0005284 A1 | 1/2008 | Ungar et al. |
| 2008/0033776 A1 | 2/2008 | Marchese |
| 2008/0034058 A1 | 2/2008 | Korman et al. |
| 2008/0040673 A1 | 2/2008 | Zuckerberg et al. |
| 2008/0103906 A1 | 5/2008 | Singh |
| 2008/0109245 A1 | 5/2008 | Gupta |
| 2008/0109491 A1 | 5/2008 | Gupta |
| 2008/0120379 A1 | 5/2008 | Malik |
| 2008/0126476 A1 | 5/2008 | Nicholas et al. |
| 2008/0133488 A1 | 6/2008 | Bandaru et al. |
| 2008/0178125 A1 | 7/2008 | Elsbree et al. |
| 2008/0189406 A1 | 8/2008 | Shen |
| 2008/0201344 A1 | 8/2008 | Levergood et al. |
| 2008/0215591 A1 | 9/2008 | Howard et al. |
| 2008/0221870 A1 | 9/2008 | Attardi et al. |
| 2008/0225848 A1 | 9/2008 | Pilon et al. |
| 2008/0263603 A1 | 10/2008 | Murray et al. |
| 2008/0294680 A1 | 11/2008 | Powell et al. |
| 2008/0306830 A1 | 12/2008 | Lasa et al. |
| 2009/0013043 A1 | 1/2009 | Tan |
| 2009/0024554 A1* | 1/2009 | Murdock ........... G06Q 30/0276 706/48 |
| 2009/0043852 A1 | 2/2009 | Weir et al. |
| 2009/0089657 A1 | 4/2009 | Davis |
| 2009/0106080 A1 | 4/2009 | Carrier et al. |
| 2009/0132311 A1 | 5/2009 | Klinger et al. |
| 2009/0138472 A1 | 5/2009 | MacLean |
| 2009/0144723 A1 | 6/2009 | Hartin et al. |
| 2009/0157667 A1 | 6/2009 | Brougher et al. |
| 2009/0157708 A1 | 6/2009 | Bandini et al. |
| 2009/0157899 A1 | 6/2009 | Gagliardi et al. |
| 2009/0158265 A1 | 6/2009 | Davis et al. |
| 2009/0177670 A1 | 7/2009 | Grenier et al. |
| 2009/0181649 A1 | 7/2009 | Bull et al. |
| 2009/0210282 A1 | 8/2009 | Elenbaas et al. |
| 2009/0249451 A1 | 10/2009 | Su et al. |
| 2009/0292608 A1 | 11/2009 | Polachek |
| 2009/0292722 A1 | 11/2009 | Oo |
| 2009/0300036 A1 | 12/2009 | Nagasaki |
| 2010/0071052 A1 | 3/2010 | Mao et al. |
| 2010/0082503 A1 | 4/2010 | Kantak et al. |
| 2010/0106730 A1 | 4/2010 | Aminian et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0153516 A1 | 6/2010 | Weinberg et al. |
| 2010/0169148 A1 | 7/2010 | Oberhofer et al. |
| 2010/0174813 A1 | 7/2010 | Hildreth et al. |
| 2010/0205663 A1 | 8/2010 | Ward et al. |
| 2010/0223341 A1 | 9/2010 | Manolescu et al. |
| 2010/0246797 A1 | 9/2010 | Chavez et al. |
| 2010/0250683 A1 | 9/2010 | Hoyne et al. |
| 2010/0274732 A1 | 10/2010 | Grinchenko et al. |
| 2010/0281258 A1 | 11/2010 | Andress et al. |
| 2010/0287512 A1 | 11/2010 | Gan et al. |
| 2010/0293560 A1 | 11/2010 | Bland et al. |
| 2010/0306122 A1 | 12/2010 | Shaffer |
| 2010/0306528 A1 | 12/2010 | Andress et al. |
| 2010/0312769 A1 | 12/2010 | Bailey et al. |
| 2011/0004922 A1 | 1/2011 | Bono et al. |
| 2011/0055217 A1 | 3/2011 | Kamel et al. |
| 2011/0055264 A1 | 3/2011 | Sundelin et al. |
| 2011/0077988 A1 | 3/2011 | Cates et al. |
| 2011/0113041 A1 | 5/2011 | Hawthorne et al. |
| 2011/0119593 A1 | 5/2011 | Jacobson et al. |
| 2011/0125826 A1 | 5/2011 | Erhart et al. |
| 2011/0144801 A1 | 6/2011 | Selker et al. |
| 2011/0153603 A1 | 6/2011 | Adiba et al. |
| 2011/0197146 A1 | 8/2011 | Goto et al. |
| 2011/0212430 A1 | 9/2011 | Smithmier et al. |
| 2011/0219087 A1 | 9/2011 | Jorasch et al. |
| 2011/0246513 A1 | 10/2011 | Covannon et al. |
| 2011/0283366 A1 | 11/2011 | Kwon et al. |
| 2011/0289574 A1 | 11/2011 | Hull et al. |
| 2011/0302653 A1 | 12/2011 | Frantz et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0089706 A1 | 4/2012 | Collins et al. |
| 2012/0095861 A1 | 4/2012 | Feng et al. |
| 2012/0102021 A1 | 4/2012 | Hill et al. |
| 2012/0117059 A1 | 5/2012 | Bailey et al. |
| 2012/0131653 A1 | 5/2012 | Pasquero et al. |
| 2012/0150759 A1 | 6/2012 | Tarjan |
| 2012/0158632 A1 | 6/2012 | Grenier et al. |
| 2012/0195422 A1 | 8/2012 | Famous |
| 2012/0198197 A1 | 8/2012 | Gladwin et al. |
| 2012/0208568 A1 | 8/2012 | Cooley |
| 2012/0210119 A1 | 8/2012 | Baxter et al. |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0317198 A1 | 12/2012 | Patton et al. |
| 2013/0006403 A1 | 1/2013 | Moore et al. |
| 2013/0007121 A1 | 1/2013 | Fontenot et al. |
| 2013/0018957 A1 | 1/2013 | Parnaby et al. |
| 2013/0024522 A1 | 1/2013 | Pierre et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0126042 A1 | 5/2013 | Dewald et al. |
| 2013/0138428 A1 | 5/2013 | Chandramouli et al. |
| 2013/0138742 A1 | 5/2013 | Dziubinski |
| 2013/0159472 A1 | 6/2013 | Newton et al. |
| 2013/0198260 A1 | 8/2013 | Dow et al. |
| 2013/0212349 A1 | 8/2013 | Maruyama |
| 2013/0218801 A1 | 8/2013 | Rago |
| 2013/0218865 A1 | 8/2013 | Angulo et al. |
| 2013/0235069 A1 | 9/2013 | Ubillos et al. |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1 | 11/2013 | Spivack et al. |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2013/0332262 A1 | 12/2013 | Hunt et al. |
| 2013/0332263 A1 | 12/2013 | Vora et al. |
| 2013/0346575 A1* | 12/2013 | Frenkel ................. G06Q 50/01 709/223 |
| 2013/0346872 A1 | 12/2013 | Scott et al. |
| 2014/0006524 A1 | 1/2014 | Singh et al. |
| 2014/0032306 A1 | 1/2014 | Sukornyk et al. |
| 2014/0040275 A1 | 2/2014 | Dang et al. |
| 2014/0040377 A1 | 2/2014 | Friedman et al. |
| 2014/0040993 A1 | 2/2014 | Lorenzo et al. |
| 2014/0047429 A1 | 2/2014 | Gaither et al. |
| 2014/0067520 A1 | 3/2014 | Campanile |
| 2014/0074844 A1 | 3/2014 | Subramanian et al. |
| 2014/0075004 A1 | 3/2014 | Dusen et al. |
| 2014/0082072 A1 | 3/2014 | Kass et al. |
| 2014/0108675 A1 | 4/2014 | Wu |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |
| 2014/0181194 A1 | 6/2014 | Sullivan |

(56) References Cited

U.S. PATENT DOCUMENTS

| | | |
|---|---|---|
| 2014/0181728 A1 | 6/2014 | Wu |
| 2014/0184841 A1 | 7/2014 | Woo et al. |
| 2014/0189808 A1 | 7/2014 | Mahaffey et al. |
| 2014/0200989 A1 | 7/2014 | Kassko et al. |
| 2014/0222834 A1 | 8/2014 | Parikh et al. |
| 2014/0223527 A1 | 8/2014 | Bortz et al. |
| 2014/0244621 A1 | 8/2014 | Lindsay |
| 2014/0278785 A1 | 9/2014 | Gaedcke et al. |
| 2014/0280113 A1 | 9/2014 | Hohwald |
| 2014/0280398 A1 | 9/2014 | Smith et al. |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0337953 A1 | 11/2014 | Banatwala et al. |
| 2014/0358911 A1 | 12/2014 | McCarthy et al. |
| 2015/0006708 A1 | 1/2015 | Banke et al. |
| 2015/0032492 A1 | 1/2015 | Ting et al. |
| 2015/0032751 A1 | 1/2015 | Ting et al. |
| 2015/0039705 A1 | 2/2015 | Kursun |
| 2015/0067160 A1 | 3/2015 | Sridhar et al. |
| 2015/0100537 A1 | 4/2015 | Grieves et al. |
| 2015/0112918 A1 | 4/2015 | Zheng et al. |
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0142748 A1 | 5/2015 | Gottemukkula et al. |
| 2015/0161211 A1 | 6/2015 | Patel et al. |
| 2015/0163189 A1* | 6/2015 | Proctor ............... G06F 16/248 715/753 |
| 2015/0169703 A1* | 6/2015 | Chang ............... G06F 16/951 707/723 |
| 2015/0170294 A1 | 6/2015 | Goyal et al. |
| 2015/0188907 A1 | 7/2015 | Khalid et al. |
| 2015/0193504 A1 | 7/2015 | Naidu et al. |
| 2015/0244706 A1 | 8/2015 | Grajek et al. |
| 2015/0281227 A1 | 10/2015 | Ivey et al. |
| 2015/0286643 A1 | 10/2015 | Kumar et al. |
| 2015/0288522 A1 | 10/2015 | McCoy et al. |
| 2015/0295869 A1 | 10/2015 | Li et al. |
| 2015/0310018 A1 | 10/2015 | Fan et al. |
| 2015/0310020 A1 | 10/2015 | Brav et al. |
| 2015/0310571 A1 | 10/2015 | Brav et al. |
| 2015/0312200 A1 | 10/2015 | Brav et al. |
| 2015/0334102 A1 | 11/2015 | Haugsnes |
| 2015/0347616 A1 | 12/2015 | Levi et al. |
| 2015/0381552 A1 | 12/2015 | Vijay et al. |
| 2016/0019628 A1 | 1/2016 | Udumudi et al. |
| 2016/0021097 A1 | 1/2016 | Shrotri |
| 2016/0034551 A1 | 2/2016 | Huang et al. |
| 2016/0042053 A1 | 2/2016 | Webber |
| 2016/0055250 A1 | 2/2016 | Rush |
| 2016/0055541 A1 | 2/2016 | Calistri-Yeh |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondal et al. |
| 2016/0132973 A1 | 5/2016 | Wu |
| 2016/0134580 A1 | 5/2016 | Castera et al. |
| 2016/0147760 A1 | 5/2016 | Anandhavelu et al. |
| 2016/0151704 A1 | 6/2016 | Wu |
| 2016/0164863 A1 | 6/2016 | Hitchcock et al. |
| 2016/0203221 A1 | 7/2016 | Rao et al. |
| 2016/0203523 A1 | 7/2016 | Spasojevic et al. |
| 2016/0210555 A1 | 7/2016 | Murphy et al. |
| 2016/0212100 A1 | 7/2016 | Banerjee |
| 2016/0255034 A1 | 9/2016 | Yuan |
| 2016/0269344 A1 | 9/2016 | Anders et al. |
| 2016/0320926 A1 | 11/2016 | Ganin et al. |
| 2016/0321261 A1 | 11/2016 | Spasojevic et al. |
| 2016/0321562 A1 | 11/2016 | Zeng |
| 2016/0321694 A1 | 11/2016 | Vorozhtsov |
| 2016/0335572 A1 | 11/2016 | Bennett et al. |
| 2016/0352667 A1 | 12/2016 | Pickett et al. |
| 2017/0046112 A1 | 2/2017 | Keller et al. |
| 2017/0048237 A1 | 2/2017 | Pfitzmann et al. |
| 2017/0061248 A1 | 3/2017 | Ryan, Jr. et al. |
| 2017/0132276 A1 | 5/2017 | Saurabh et al. |
| 2017/0154356 A1 | 6/2017 | Trevisiol et al. |
| 2017/0154366 A1 | 6/2017 | Turgeman |
| 2017/0177562 A1 | 6/2017 | Scott et al. |
| 2017/0180294 A1 | 6/2017 | Milligan et al. |
| 2017/0193546 A1 | 7/2017 | Bennett et al. |
| 2017/0255536 A1 | 9/2017 | Weissinger et al. |
| 2017/0264619 A1 | 9/2017 | Narayanaswamy et al. |
| 2017/0300490 A1 | 10/2017 | Kachemir et al. |
| 2017/0344748 A1 | 11/2017 | Ghani et al. |
| 2017/0366636 A1 | 12/2017 | Wang et al. |
| 2018/0027075 A1 | 1/2018 | Schoeffler et al. |
| 2018/0041336 A1 | 2/2018 | Keshava et al. |
| 2018/0053114 A1 | 2/2018 | Adjaoute |
| 2018/0081983 A1 | 3/2018 | Carru et al. |
| 2018/0091468 A1 | 3/2018 | Yong et al. |
| 2018/0097802 A1 | 4/2018 | Lander et al. |
| 2018/0115473 A1 | 4/2018 | Sridhar et al. |
| 2018/0144389 A1 | 5/2018 | Fredrich et al. |
| 2018/0152471 A1 | 5/2018 | Jakobsson |
| 2018/0211285 A1 | 7/2018 | Todasco et al. |
| 2018/0219830 A1 | 8/2018 | O'Brien et al. |
| 2018/0278503 A1 | 9/2018 | Carey et al. |
| 2018/0293607 A1 | 10/2018 | Huddleston et al. |
| 2018/0295137 A1 | 10/2018 | Zager et al. |
| 2018/0329565 A1 | 11/2018 | Yeung et al. |
| 2018/0332079 A1 | 11/2018 | Ashley et al. |
| 2018/0337907 A1 | 11/2018 | Bhansali et al. |
| 2018/0337910 A1 | 11/2018 | Gustavson et al. |
| 2018/0367484 A1 | 12/2018 | Rodriguez et al. |
| 2019/0057204 A1 | 2/2019 | Marcovecchio et al. |
| 2019/0114356 A1 | 4/2019 | Senftleber et al. |
| 2019/0116137 A1 | 4/2019 | Senftleber et al. |
| 2019/0116148 A1 | 4/2019 | Senftleber et al. |
| 2019/0158610 A1 | 5/2019 | Holzband et al. |
| 2019/0159166 A1 | 5/2019 | Aggarwal et al. |
| 2019/0228093 A1 | 7/2019 | Falcao et al. |
| 2019/0230151 A1 | 7/2019 | Falcao et al. |
| 2019/0245751 A1 | 8/2019 | Wong |
| 2019/0306248 A1 | 10/2019 | Swarangi et al. |
| 2019/0347984 A1 | 11/2019 | Hintermeister |
| 2019/0354709 A1 | 11/2019 | Brinskelle |
| 2020/0007530 A1 | 1/2020 | Abdul et al. |
| 2020/0051120 A1 | 2/2020 | Senftleber et al. |
| 2020/0053094 A1 | 2/2020 | Kaube et al. |
| 2020/0099676 A1 | 3/2020 | Desarda et al. |
| 2020/0104478 A1 | 4/2020 | Chauhan |
| 2020/0120068 A1 | 4/2020 | Senftleber et al. |
| 2020/0120095 A1 | 4/2020 | Senftleber et al. |
| 2020/0120096 A1 | 4/2020 | Senftleber et al. |
| 2020/0120167 A1 | 4/2020 | Senftleber et al. |
| 2020/0151829 A1 | 5/2020 | Wu |
| 2020/0184575 A1 | 6/2020 | Gaedcke et al. |
| 2020/0258091 A1 | 8/2020 | Gaedcke et al. |
| 2020/0287957 A1 | 9/2020 | Falcao et al. |
| 2020/0329110 A1 | 10/2020 | Holzband et al. |
| 2020/0358755 A1 | 11/2020 | Abdul et al. |
| 2020/0366564 A1 | 11/2020 | Davis et al. |
| 2021/0119967 A1 | 4/2021 | Senftleber et al. |
| 2021/0176136 A1 | 6/2021 | Davis et al. |
| 2021/0226952 A1 | 7/2021 | Senftleber et al. |

FOREIGN PATENT DOCUMENTS

| | | |
|---|---|---|
| WO | 2009047674 A2 | 4/2009 |
| WO | 2013158839 A1 | 10/2013 |
| WO | 2014089460 A2 | 6/2014 |
| WO | 2014153463 A3 | 1/2015 |
| WO | 2015013436 A2 | 1/2015 |
| WO | 2019075284 A2 | 4/2019 |

(56) References Cited

FOREIGN PATENT DOCUMENTS

WO 2019144159 A1 7/2019
WO 2020232311 A1 11/2020

OTHER PUBLICATIONS

Dinh, Khanh Q., Non-Final Office Action dated Mar. 17, 2021 for U.S. Appl. No. 16/820,697.
Dinh, Khanh Q., Notice of Allowance and Fee(s) Due dated Apr. 16, 2021 for U.S. Appl. No. 16/820,697.
Fiorillo, James N., Non-Final Office Action dated Jun. 7, 2021 for U.S. Appl. No. 16/827,625.
Frunzi, Victoria E., Final Office Action dated May 17, 2021 for U.S. Appl. No. 16/590,218.
Frunzi, Victoria E., Non-Final Office Action dated Dec. 21, 2020 for U.S. Appl. No. 16/590,218.
Goldberg, Ivan R., Final Office Action dated Jun. 29, 2021 for U.S. Appl. No. 16/695,098.
Goldberg, Ivan R., Final Office Action dated Jun. 29, 2021 for U.S. Appl. No. 16/701,143.
Goldberg, Ivan R., Non-Final Office Action dated Mar. 10, 2021 for U.S. Appl. No. 16/695,098.
Goldberg, Ivan R., Non-Final Office Action dated Mar. 3, 2021 for U.S. Appl. No. 16/701,143.
M. Rowe and H. Alani, "What Makes Communities Tick? Community Health Analysis Using Role Compositions," 2012 International Conference on Privacy, Security, Risk and Trust and 2012 International Conference on Social Computing, Amsterdam, Netherlands, 2012, pp. 267-276, doing:10.1109/SocialCom-PASSAT2012.18.
Mesa, Joel, Notice of Allowance and Fee(s) Due dated Feb. 24, 2021 for U.S. Appl. No. 15/782,635.
Nano, Sargon N., Notice of Allowance and Fee(s) Due dated May 19, 2021 for U.S. Appl. No. 17/026,152.
Neuman, Clifford B., Proxy-Based Authorization and Accounting for Distributed Systems, IEEE 1993 (Year: 1993).
Rashid, Ishrat, Final Office Action dated Jun. 15, 2021 for U.S. Appl. No. 15/782,653.
Rashid, Ishrat, Non-Final Office Action dated Apr. 2, 2021 for U.S. Appl. No. 15/782,653.
Shaw, Robert A., Final Office Action dated Mar. 16, 2021 for U.S. Appl. No. 16/158,169.
U.S. Appl. No. 11/333,826, filed Jan. 17, 2006 and entitled, "Knowledge Filter".
U.S. Appl. No. 11/692,169, filed Mar. 27, 2007 and entitled, "Knowledge Filter".
U.S. Appl. No. 60/158,496, filed Oct. 8, 1999 and entitled, "Knowledge Filter".
U.S. Appl. No. 60/816,100, filed Jun. 22, 2006 and entitled, "Knowledge Filter".
U.S. Appl. No. 60/816,900, filed Jun. 26, 2006 and entitled, "Knowledge Filter".
"Craigslist Online Community." Craigslist.org. Jul. 6, 2010.
Ahmed, Saba, Final Office Action dated Jun. 29, 2016 for U.S. Appl. No. 14/098,492.
Ahmed, Saba, Non-Final Office Action dated Nov. 19, 2015 for U.S. Appl. No. 14/098,492.
Anicas, Mitchell; An Introduction to OAuth 2, DigitalOcean, Published Jul. 21, 2014, Retrieved Jan. 29, 2021; <>.
Arentz et al., Classifying offensive sites based on image content [online], Computer Vision and Image Understanding 94, 295-310, 2004, Retrieved from the Internet: .
Bista, Sanat Kumar et al., "Using Gamification in an Online Community," CSIRO ITC Centre, Conference Paper, 2012.
Blaufeld, Justin R., Final Office Action dated Mar. 24, 2016 for U.S. Appl. No. 14/098,501.
Blaufeld, Justin R., Non-Final Office Action dated Sep. 24, 2015 for U.S. Appl. No. 14/098,501.

Bostock, Mike, Sankey Diagram, available at http://bost.ocks.org/mike/sankey, published May 21, 2012, 1 pg.
Brown Jr., Nathan H., Final Office Action dated Mar. 29, 2011 for U.S. Appl. No. 11/971,856.
Brown Jr., Nathan H., Non-Final Office Action dated Jun. 6, 2012 for U.S. Appl. No. 13/167,482.
Brown Jr., Nathan H., Non-Final Office Action dated Mar. 24, 2014 for U.S. Appl. No. 13/780,487.
Brown Jr., Nathan H., Non-Final Office Action dated Nov. 26, 2010 for U.S. Appl. No. 11/971,856.
Bui, Hanh Thi Minh, Non-Final Office Action dated Mar. 13, 2015 for U.S. Appl. No. 14/012,978.
Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[May 13, 2016 12:36:15 PM].
Chung, Mong-Shune, Non-Final Office Action dated Jan. 29, 2016 for U.S. Appl. No. 14/098,505.
Constine, Josh, "Facebook tests notification unsubscribe button for feed posts," Aug. 9, 2010. http://www.adweek.com/socialtime/unsubscribe-button-posts/244868.
Dagnew, Saba, Final Office Action dated Feb. 12, 2020 for U.S. Appl. No. 15/581,795.
Dagnew, Saba, Non-Final Office Action for U.S. Appl. No. 15/581,795 dated Sep. 16, 2019.
Dinh, Khanh Q., Notice of Allowance and Fee(s) Due dated Oct. 29, 2019 for U.S. Appl. No. 15/877,379.
Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[May 13, 2016 10:48:43 AM].
Emojipedia, (https://web.archive.org/web/20150915110235/https://emojipedia.org/fisted-hand-sign/), Date: Sep. 15, 2015 (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.
Falcao et al., U.S. Appl. No. 15/877,379, filed Jan. 22, 2018 and entitled, "Temporal Optimization of Data Operations Using Distributed Search and Server Management."
Falcao et al., U.S. Appl. No. 15/877,381, filed Jan. 22, 2018 and entitled, "Temporal Optimization of Data Operations Using Distributed Search and Server Management."
Fett et al., The Web SSO Standard OpenID Connect: In-Depth Formal Security Analysis and Security Guidelines, 2017 IEEE 30th Computer Security Foundations Symposium (Year: 2017).
Filipczyk, Marcin R., Final Office Action dated Oct. 5, 2015 for U.S. Appl. No. 13/950,268.
Filipczyk, Marcin R., Non-Final Office Action dated Mar. 10, 2016 for U.S. Appl. No. 13/950,268.
Filipczyk, Marcin R., Non-Final Office action dated May 22, 2015 for U.S. Appl. No. 13/950,268.
Fiorillo, James N., Non-Final Office Action for U.S. Appl. No. 15/821,543 dated Aug. 16, 2019.
Fiorillo, James N., Notice of Allowance and Fee(s) Due dated Nov. 14, 2019 for U.S. Appl. No. 15/821,543.
Friedman et al., U.S. Appl. No. 61/650,849, filed May 23, 2012 and entitled, "Dynamic Information Streams in a Social Network Platform."
Frunzi, Victoria E., Non-Final Office Action dated Oct. 16, 2018 for U.S. Appl. No. 15/018,787.
Gaedckle et al., U.S. Appl. No. 61/636,132, filed Apr. 20, 2012 and entitled, "System and Method for Providing a Social Customer Care System."
Georgandellis, Andrew C., Final Office Action dated Mar. 30, 2016 for U.S. Appl. No. 13/900,878.
Georgandellis, Andrew C., Final Office Action dated Oct. 26, 2017 for U.S. Appl. No. 13/900,878.
Georgandellis, Andrew C., Final Office Action dated Sep. 21, 2016 for U.S. Appl. No. 14/035,166.
Georgandellis, Andrew C., Non-Final Office Action dated Jan. 26, 2017 for U.S. Appl. No. 13/900,878.

(56) References Cited

OTHER PUBLICATIONS

Georgandellis, Andrew C., Non-Final Office Action dated Jul. 11, 2016 for U.S. Appl. No. 14/035,166.
Georgandellis, Andrew C., Non-Final Office Action dated May 23, 2017 for U.S. Appl. No. 14/035,166.
Georgandellis, Andrew C., Non-Final Office Action dated Nov. 3, 2015 for U.S. Appl. No. 13/900,878.
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19 2015.
Goldberg, Ivan R., Final Office Action dated Jan. 12, 2015 for U.S. Appl. No. 13/835,502.
Goldberg, Ivan R., Final Office Action dated Jan. 13, 2015 for U.S. Appl. No. 13/835,250.
Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.
Hatcher, Deirdre D., Non-Final Office Action dated Jan. 14, 2016 for U.S. Appl. No. 13/950,258.
Holzband et al., U.S. Appl. No. 15/821,543, filed Nov. 22, 2017 and entitled, "Responsive Action Prediction Based On Electronic Messages Among a System of Networked Computing Devices."
Jang, Gijeong, Written Opinion of the International Searching Authority and International Search Report dated Jul. 28, 2015 for International Patent Application No. PCT/US2014/047866.
Jou et al., "Predicting Viewer Perceived Emotions in Animated GIFs", Nov. 3-7, 2014 (4 pages).
Kim, Harry C., Notification of Transmittal of the International Search Report and the Written Opinion of the International Searching Authority, or the Declaration dated Sep. 16, 2020 for International Patent Application No. PCT/US2020/032999.
Kolosowski-Gager, Katherine, Final Office Action dated Feb. 11, 2019 for U.S. Appl. No. 14/627,151.
Kolosowski-Gager, Katherine, Non-Final Office Action dated Jun. 29, 2018 for U.S. Appl. No. 14/627,151.
Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.
Lithium Website, http://www.lithium.com, Dec. 11, 2010, retrieved from Internet Archive, pp. 1-9.
Liu et al., OAuth Based Authentication and Authorization in Open Telco API; International Conference on Computer Science and Electronics Engineering, 2012 (Year: 2012).
M2 PressWire, "Alterian: Social media monitoring and analytics comes of age with Alterian's acquisition of market leader Techrigy," Jul. 15, 2009, Anonymous, Norman Media Ltd, London.
Matthews, Tara, et al. "Community Insights: Helping Community Leaders Enhance the Value of Enterprise Online Communities." Proceedings of the SIGCHI Conference on Human Factors in Computing Systems, Apr. 27-May 2, 2013, Paris, France. ACM (2013). pp. 513-522.
Meng, Jau Shya, Non-Final Office Action dated Jan. 3, 2020 for U.S. Appl. No. 15/877,381.
Meng, Jau Shya, Non-Final Office Action dated Jun. 16, 2020 for U.S. Appl. No. 15/877,381.
Mesa, Joel, Final Office Action dated Mar. 30, 2020 for U.S. Appl. No. 15/782,635.
Mesa, Joel, Non-Final Office Action for U.S. Appl. No. 15/782,635 dated Oct. 4, 2019.
Mesa, Joel, Non-Final Office Action dated Oct. 6, 2020 for U.S. Appl. No. 15/782,635.
Mosley, Kyle T., Non-Final Office Action dated Dec. 28, 2017 for U.S. Appl. No. 14/852,965.
Mosley, Kyle T., Non-Final Office Action dated Oct. 4, 2017 for U.S. Appl. No. 14/627,151.
Netzloff, Eric R., Non-Final Office Action dated Nov. 25, 2014 for U.S. Appl. No. 13/848,706.
Netzloff, Eric R., Non-Final Office Action dated Nov. 6, 2018 for U.S. Appl. No. 14/824,021.
Niruntasukrat et al., Authorization Mechanism for MQTT-based Internet of Things, IEEE ICC 2016 Workshops W07-Workshop on Convergent Internet of Things (Year: 2016).
Ofori-Awuah, Maame, Final Office Action dated Oct. 2, 2020 for U.S. Appl. No. 14/929,209.
Ofori-Awuah, Maame, Final Office Action dated Sep. 6, 2019 for U.S. Appl. No. 14/929,209.
Ofori-Awuah, Maame, Non-Final Office Action dated Apr. 5, 2019 for U.S. Appl. No. 14/929,209.
Oh, Eung Gie, Written Opinion of the International Searching Authority and International Search Report dated Nov. 18, 2014 for International Patent Application No. PCT/US2014/031345.
Olshannikov, Alex, Final Office Action dated Apr. 15, 2016 for U.S. Appl. No. 14/098,480.
Olshannikov, Alex, Final Office Action dated Feb. 17, 2016 for U.S. Appl. No. 14/098,509.
Olshannikov, Alex, Non-Final Office Action dated Nov. 5, 2015 for U.S. Appl. No. 14/098,480.
Olshannikov, Alex, Non-Final Office Action dated Oct. 22, 2015 for U.S. Appl. No. 14/098,509.
Perungavoor, Venkatanaray, Notice of Allowance and Fee(s) Due for U.S. Appl. No. 16/158,167, dated May 15, 2020.
Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.
Rao et al., U.S. Appl. No. 62/049,642, filed Sep. 12, 2014 and entitled, "System and Apparatus for an Application Agnostic User Search Engine."
Rashid, Ishrat, Final Office Action for U.S. Appl. No. 15/782,653 dated Sep. 19, 2019.
Rashid, Ishrat, Non-Final Office Action dated Jun. 11, 2019 for U.S. Appl. No. 15/782,653.
Rashid, Ishrat, Non-Final Office Action dated Jun. 12, 2020 for U.S. Appl. No. 15/782,653.
Senftleber et al., International (PCT) Patent Application No. PCT/US2018/055545, filed Oct. 12, 2018 and entitled, "Predicting Performance of Content and Electronic Messages Among a System of Networked Computing Devices."
Senftleber et al., U.S. Appl. No. 15/782,635, filed Oct. 12, 2017 and entitled, "Computerized Tools To Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."
Senftleber et al., U.S. Appl. No. 16/158,167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multi-Factor Authentication Using Credential and Authentication Management in Scalable Data Networks."
Suh, Andrew, Non-Final Office Action dated Jul. 8, 2020 for U.S. Appl. No. 16/158,172.
Tabor, Amare F., Final Office Action dated Apr. 8, 2015 for U.S. Appl. No. 13/871,076.
Tabor, Amare F., Non-Final Office Action dated Aug. 15, 2014 for U.S. Appl. No. 13/871,076.
Takesue, Masaru, An HTTP Extension for Secure Transfer of Confidential Data, 2009 IEEE International Conference on Networking, Architecture, and Storage, Hunan, 2009, pp. 101-108, doi: 10.1109/NAS.2009.21.

(56) References Cited

OTHER PUBLICATIONS

Takesue, Masaru, An HTTP Extension for Secure Transfer of Confidential Data. IEEE, 2009 (Year: 2009).
Thomas, Shane, Written Opinion of the International Searching Authority and International Search Report dated Aug. 16, 2013 for International Patent Application No. PCT/US2013/037107.
Trapanese, William C., Non-Final Office Action dated May 27, 2020 for U.S. Appl. No. 16/413,577.
Vo, Huyen X., Non-Final Office Action dated Mar. 15, 2019 for U.S. Appl. No. 15/782,642.
Vo, Huyen X., Non-Final Office Action dated Oct. 15, 2020 for U.S. Appl. No. 16/458,183.
Walsh, John B., Non-Final Office Action dated Mar. 24, 2017 for U.S. Appl. No. 14/702,696.
Wang, Xiaoqing, and Shannon Lantzy. "A Systematic Examination of Member Turnover and Online Community Health." Thirty Second International Conference on Information Systems, Shanghai (2011), pp. 1-11.
Wollenstein et al., U.S. Appl. No. 61/639,509, filed Apr. 27, 2012 and entitled, "Systems and Methods for Implementing Custom Privacy Settings."
Wu, Michael, U.S. Appl. No. 61/734,927, filed Dec. 7, 2012 and entitled, "Systems and Methods for Presenting Analytic Data."
Wu, Michael, U.S. Appl. No. 62/072,929, filed Oct. 30, 2014 and entitled, "Systems and Methods To Monitor Health of Online Social Communities."
Young, Lee W., Notification of Transmittal of the International Search Report and the Written Opinion of the International Searching Authority, or the Declaration, dated Apr. 1, 2019 for International Application No. PCT/US2018/05545.
Young, Lee W., Written Opinion of the International Searching Authority and International Search Report dated May 28, 2014 for International Patent Application No. PCT/US2013/073625.
Young, Lee W.; Notification of Transmittal of the International Search Report and the Written Opinion of the International Searching Authority, or the Declaration dated Jun. 24, 2019 for International Application No. PCT/US2019/014637.
Goldberg, Ivan R., Final Office Action dated Jan. 15, 2015 for U.S. Appl. No. 13/865,429.
Goldberg, Ivan R., Non-Final Office Action dated Apr. 13, 2016 for U.S. Appl. No. 13/865,429.
Goldberg, Ivan R., Non-Final Office Action dated Jun. 18, 2014 for U.S. Appl. No. 13/835,250.
Goldberg, Ivan R., Non-Final Office Action dated Jun. 18, 2014 for U.S. Appl. No. 13/835,502.
Goldberg, Ivan R., Non-Final Office Action dated Jun. 20, 2014 for U.S. Appl. No. 13/865,411.
Goldberg, Ivan R., Non-Final Office Action dated Jun. 23, 2014 for U.S. Appl. No. 13/865,429.
Hardt, Dick, The OAuth 2.0 Authorization Framework draft-ieft-oauth-v2-31; Internet Engineering Task Force (IEFT) (Year: 2012).
Senftleber et al., U.S. Appl. No. 16/194,126, filed Nov. 16, 2018 and entitled, "Multiplexed Data Exchange Portal Interface in Scalable Data Networks."
Shaw, Robert A., Non-Final Office Action dated Jan. 22, 2021 for U.S. Appl. No. 16/158,169.
Singh, Amardeep, IP Australia, Examination Report No. 1 for Australia Patent Application No. 2019209542 dated Dec. 17, 2020.
Spasojevic et al., U.S. Appl. No. 61/943,047, filed Feb. 21, 2014 and entitled, "Domain Generic Large Scale Topic Expertise & Interest Mining Across Multiple Online Social Networks."
Spasojevic, Nemanja et al., "When-To-Post on Social Networks", International Conference on Knowledge Discovery and Data Mining (KDD), Aug. 10-13, 2015, pp. 2127-2136, Retrieved Online: http://dl.acm.org/citation.cfm?d=2788584.
Suh, Andrew, Final Office Action dated Dec. 3, 2020 for U.S. Appl. No. 16/158,172.

\* cited by examiner

AFTER GENERATING THIRD RECCOMMENDED TIME 10:00A

AFTER GENERATING FOURTH RECCOMMENDED TIME 9:43A

SYSTEM AND METHOD OF PROVIDING A PLATFORM FOR MANAGING DATA CONTENT CAMPAIGN ON SOCIAL NETWORKS

CROSS-REFERENCE TO RELATED APPLICATIONS

This nonprovisional application is a continuation application of co-pending U.S. patent application Ser. No. 15/581,795, filed Apr. 28, 2017, and entitled "SYSTEM AND METHOD OF PROVIDING A PLATFORM FOR MANAGING DATA CONTENT CAMPAIGN ON SOCIAL NETWORKS," which is herein incorporated by reference for all purposes.

FIELD

The present invention relates to a system and method of providing a platform for managing a campaign for publishing data content on social networks.

BACKGROUND

Social networks have emerged as major platform for communication over the years, with hundreds of millions of interactions created by users every day. Marketing experts have long recognized that an effective marketing strategy must include a presence on social networks. For many corporate users that desire to post data content (also referred to as content data or content herein), one of their goals when broadcasting content (e.g., messages) is to capture the attention of a large number of audience members on these social networks so that such audience members may react to the posted content. The likelihood that audience members react to posted content may differ depending on various factors such as location, daily and weekly behavior patterns, time zone and volume of other content competing for the attention of the audience members. To address this, Lithium Technologies, Inc. developed a technique or system to formulate a user's schedule for broadcasting content on a social network, in order to increase audience members' reactions. "When-To-Post on Social Networks," Spasojevic et al., Association For Computing Machinery 2015, which is incorporated by reference herein. While the system described in Spasojevic et al. is effective for its intended purpose, it would be advantageous to provide improvements to this system.

SUMMARY

Embodiments of a system and method for managing a campaign for publishing data content on social networks are disclosed.

In accordance with an embodiment of this disclosure, a computer-implemented system is disclosed for providing a platform for managing a campaign for publishing content on social networks to increase audience member reaction to the content, the system comprising: a data store: a content items database, wherein data associated with content items on one or more topics that is intended to be posted on social networks are stored; a schedule database, wherein data associated with schedules for posting the content items are stored; user account database, wherein data associated with registered users are stored; one or more servers coupled to the data store, wherein the one or more servers are programmed to execute computer program steps, the computer program steps comprising: collecting data from a first social network and a second social network relating to the activities of a plurality of users on the first and second social networks; collecting data associated with the first and second social networks relating to the users' audience; estimating a post to reaction filter for the first social network and the second social network by aggregating post to reaction times for all posted content and reactions to the posted content on the first social network and the second social network; calculating self reaction profiles for the plurality of users by aggregating data relating to user reactions to posts on the first and second social networks; calculating a user audience post reaction profile for the first social network and the second social network as a function of the post to reaction filter; generating a first schedule for posting the content on the first social network and a second schedule for posting the content on the second social network as a function of the audience post reaction profiles; and estimating a transformation function, based on post to reaction filter data, self reaction profiles and audience post reaction profiles, to transform the first schedule for posting content on the first social network into the second schedule for posting content on the second network, the transformation function thereby establishing a relationship between the first schedule for posting content on the first social network and the second schedule for posting content on the second social network.

In yet another embodiment of the disclosure, a computer-implemented system is disclosed for providing a platform for managing a campaign for publishing data content on social networks to increase audience member reaction to the data content, the system comprising: a data store: a content items database, wherein data associated with content items on one or more topics that is intended to be posted on social networks are stored; a schedule database, wherein data associated with schedules for posting the content items are stored; user account database, wherein data associated with registered users are stored; one or more servers coupled to the data store, wherein the one or more servers are programmed to execute computer program steps, the computer program steps comprising: collecting data from a first social network and a second social network relating to the activities of a plurality of users on the first and second social networks; collecting data associated with the first and second social networks relating to the users' audience; estimating a post reaction filter for first social network and second social network by aggregating post to reaction times for all posted content and reactions to the posted content on the first social network and the second social networks; calculating a self reaction profiles for the plurality of users by aggregating data relating to user reactions to posts on the first and second social networks; calculating a user audience post reaction profile for the first social network and the second social network as a function of the post to reaction filter; generate a first schedule for posting the content on the first social network and a second schedule for posting the content on the social network as a function of the audience post reaction profiles, thereby establishing a relationship between the first schedule for posting content on the first social network and the second schedule for posting content on the second social network; and estimate a user's schedule for posting a user's content on the second social network as a function of the relationship between the first schedule for posting content on the first social network and the second schedule for posting content on the second social network.

In accordance with yet another embodiment of the disclosure, a computer-implemented system is disclosed for providing a platform for managing a campaign for publishing data content on social networks to increase audience member reaction to the published data content, the system comprising: a data store: a content items database, wherein data associated with content items on one or more topics that is intended to be posted on social networks are stored; a schedule database, wherein data associated with schedules for posting the content items are stored; user account database, wherein data associated with registered users are stored; one or more servers coupled to the data store, wherein the one or more servers are programmed to execute computer program steps, the computer program steps comprising: collecting data from a social network relating to the activities of a plurality of users on the social network; attributing one or more domains to each user in the social network; calculating a post to reaction filter for the social network relative to the one or more domains; calculating a domain reaction profile for the social network by aggregating reaction of users in connection with a domain; calculating a post reaction profile for the social network; and generate a domain posting schedule for the social network independent of a user's audience on the social network.

In accordance with another embodiment of this disclosure, a method is disclosed of providing a platform for managing a campaign for publishing data content on social networks to increase reactions to the published content, the method is implemented in one or more servers programmed to execute the method, the method comprising: retrieving data content item and other metadata intended to be posted on a social network; detect one or more domains from the data content item using natural language processing; generating a posting schedule for each of the one or more domains for the social network as a function of a post to reaction filter for the social network for each domain of the one or more domains and the domain reaction profile for the social network; fetching one or more schedules for the one or more domains respectively, combining the one or more schedules for the one or more domains; and deriving a schedule for posting the data content item, the schedule derived independent of user audience reaction.

In accordance with another embodiment of this disclosure, a method is disclosed of providing a platform for managing a campaign for publishing data content on social networks to increase reactions to the published content, the method is implemented in one or more servers programmed to execute the method, the method comprising: (1) receiving a request for an interval of time in which a user desires to post a content item on a social network; (2) receiving a schedule for posting a content item and a post to reaction filter for the interval of time; (3) calculating the schedule for posting a content item on the social network and the post to reaction filter based on an interval of time that is refined with greater granularity; (4) modeling a decay function as a function of the post to reaction filter, the decay function representative of a level of interest of an audience of the user; (5) determining an optimal time to post the content item on the social network as a function of the decay function; and (6) recomputing the schedule as a function of the decay function and received schedule for posting the content item on the social network.

In accordance with yet another embodiment of the disclosure, a computer-implemented system is disclosed for providing a platform for managing a campaign for publishing data content on social networks to increase audience member reaction to the data content, the system comprising: a data store: a content items database, wherein data associated with content items on one or more topics that is intended to be posted on social networks are stored; a schedule database, wherein data associated with schedules for posting the content items are stored; user account database, wherein data associated with registered users are stored; one or more servers coupled to the data store, wherein the one or more servers are programmed to execute computer program steps, the computer program steps comprising: receiving content items from content database that are associated with a topic selected by a user for posting on a social network, wherein the one or more content items are associated with one or more URLs; estimating a post to a reaction filter for a time interval for the social network for the user, the post to a reaction filter representative of the probability distribution that a reaction to a posted content will occur within the time interval; calculating a reaction profile associated with reactions to posts on the social network by aggregating reaction time of a plurality of users on the social network for one or more content items posted on the social network; determining a schedule for posting the content items on the social network as a function of the post to reaction filter and reaction profile; and posting the content items on the social network in accordance with the schedule.

BRIEF DESCRIPTION OF THE DRAWINGS

FIGS. 10-13 depict several screen shot representations of the platform for managing a campaign for publishing data content on social networks.

DETAILED DESCRIPTION

Figure 1:
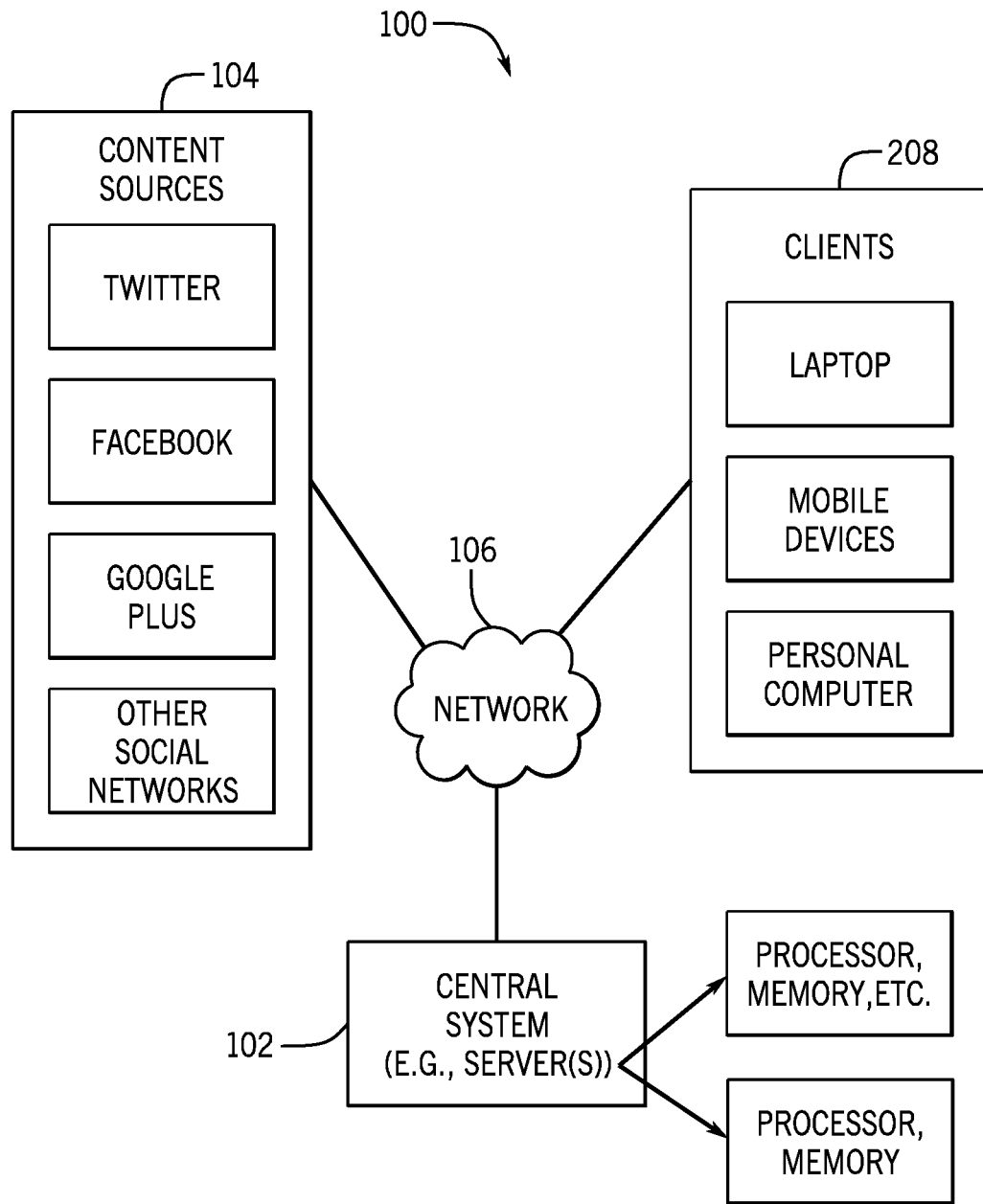
FIG. 1 depicts a block diagram illustrating an example system of providing a platform for managing a campaign for publishing data content on social networks.

Embodiments of the present disclosure are described herein with reference to the drawing figures.

FIG. 1 depicts a block diagram illustrating an example system 100 of providing a platform (200 below) for managing a campaign for publishing data content on social networks. One goal of this campaign is to increase audience reaction to published or posted content. The content may comprise one or more items associated with a URL linking an item to the specific content (e.g., article) as known to those skilled in the art. In this embodiment, system 100 includes a central system 102 that communicates with content sources 104 such as social networks including Twitter, Facebook, Google Plus and others known to those skilled in the art via network 106. Network 106 is the Internet, but it may be other communication networks such as a local area network (LAN) or both the Internet and LAN as known to those skilled in the art. System 100 also includes one or more clients 108 that enable users to communicate with social networks 104 and central system 102 via network 106 by cable, ISDN, WIFI or wireless carrier networks as known to those skilled in the art. (Data and information are used interchangeably in this disclosure unless otherwise noted.)

Central system 102 incorporates platform 200 for managing a campaign for publishing data content on social networks (described below). Platform 200 incorporates several computer software modules and databases as described in FIG. 2 below. Central system 102 includes one or more servers that may be connected together through a network such as a local area network (LAN) as known to those skilled in the art. The one or more servers may include a web server as known to those skilled in the art. Each server includes several internal components (e.g., processor, memory, drives, etc.), databases, operating system, software modules and applications (e.g., browser) as known to those skilled in the art. An example server is described below.

Content sources 104 are a system of one or more servers that comprise any number of social networks (herein after also referred to as social networks 104). Social networks 104, as known to those skilled in the art, are typically web-based systems that allow users to create a profile, post content, connect to other users, react with posted content and create a list of users with whom to share such content (e.g., social media data). Users of social networks may refer to users that post content or users that react to the content, i.e., users' audience members. Reactions to posted content are also referred to herein as interactions or engagements such as likes, favorites, clicks, user shares, comments and other reactions. The content may be photos, videos, articles or any other information and/or links linking to such content. Examples of social networks 104 include LinkedIn, Twitter, Facebook, Google Plus as shown in FIG. 1 as well as Instagram, Pinterest and Tumblr (to name a few). These web-based systems may also include a web server. Each server includes several internal components (e.g., processor, memory, drives, etc.), databases, operating system, software modules and applications (e.g., browser) as known to those skilled in the art.

Content sources 104 may also include a system of one or more servers that comprise news or other sources of information that provide RSS feeds to enable users to access such information as known to those skilled in the art as well as any number of events, articles, PDFs, videos, photos or other (together "articles") that users may access via a URL (uniform resource identifier) posted on social networks 104 that link to such articles as known to those skilled in the art. The one or more servers may include a web server as known to those skilled in the art.

Clients 208 include laptops, personal computers and mobile devices. The personal computer includes several internal components (e.g., processor, memory, drives, etc.), operating system, databases, software modules and applications (e.g., browser) as known to those skilled in the art. The mobile devices as known to those skilled in the art could be smartphones, cellular telephones, tablets, PDAs, or other devices equipped with industry standard (e.g., HTML, HTTP etc.) browsers or any other application having wired (e.g., Ethernet) or wireless access (e.g., cellular, Bluetooth, IEEE 802.11b etc.) via networking (e.g., TCP/IP) to nearby and/or remote computers, peripherals, and appliances, etc. TCP/IP (transfer control protocol/Internet protocol) is the most common means of communication today between clients or between clients and central system 102 or other systems (i.e., one or more servers), each client having an internal TCP/IP/hardware protocol stack, where the "hardware" portion of the protocol stack could be Ethernet, Token Ring, Bluetooth, IEEE 802.11b, or whatever software protocol is needed to facilitate the transfer of IP packets over a local area network. Each client 108 may access the Internet directly or through a network of one or more servers that communicates with Internet as known to those skilled in the art.

Figure 2:
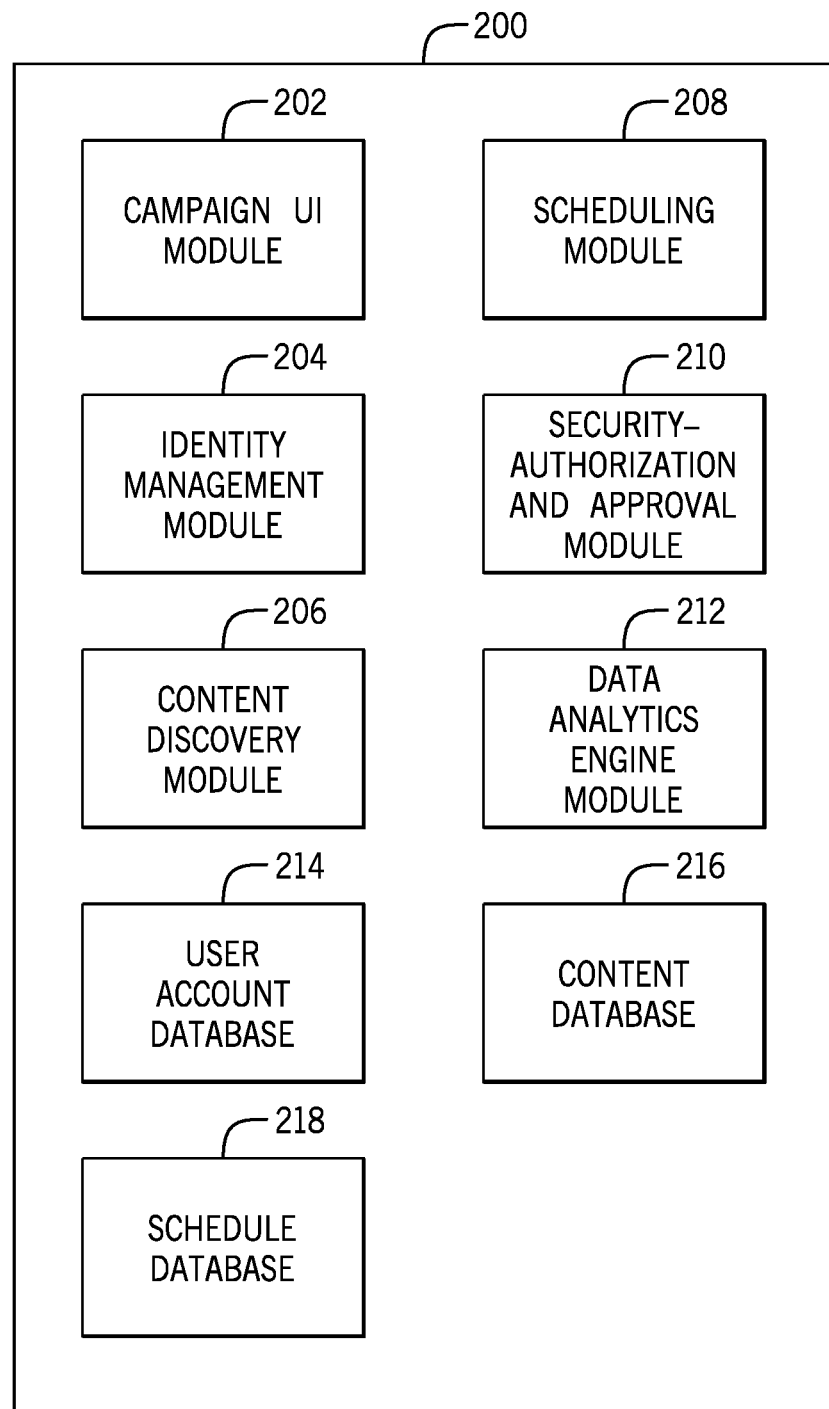
FIG. 2 depicts the central system in FIG. 1 wherein several example computer software modules and databases are shown for implementing the system of providing a platform for managing a campaign for publishing data content on social networks.

As shown in FIG. 2, central system 102 incorporates platform 200 for managing a campaign for publishing data content on social networks (described below). In brief, platform 200 is a framework that enables a user to determine optimal time to post content (e.g., a message) within a specified time period in order to maximize the probability of receiving reactions from audience members. Platform 200 performs user personalized schedule generation including estimating audience reaction, domain specific schedule personalization (tuning) and user strategy for scheduling multiple posts. Platform 200 performs all of the collection of the data from the social networks, processing of such data and posting of such data on the social networks. This is described in more detail below.

Platform 200 for managing a campaign for publishing data content on social networks comprises computer software modules and databases including campaign user interface module, 202, identity managing module 204, content discovery module 206, scheduling module 208, security-authorization and approval module 210, data analytics engine module 212, user account database 214, content database 216 and schedule database 218.

Campaign user interface module (UI) 202 is a user (who desires to post content) interface as known to those skilled in the art, that enables a user to engage with platform 200 to select content for posting and time parts for such posting. For example, module 202 enables user to (1) use a calendar to set a date and time (day parts) for posting content, (2) select content discovered or user selected, (3) select social networks in which the user desires to post such content and (4) review data metrics of all data computed (e.g., reactions and the audience members) by the data analytics module.

Identity management module 204 is a module that associates users and their login credentials with social networks to enable platform 200 to post content on such networks. Identity management module 204 communicates with user account database 214 and content database 216.

Content discovery module 206 is a module for discovering content that is used as recommendations for posting. The content is associated with topics that may be of interest to the user's audience members. Content discovery may be achieved in several ways. Klout, Inc. (Owned by Lithium Technologies, Inc.) offers a platform for content discovery. Content discovery may be achieved by employing the technology described in U.S. patent application Ser. No. 14/702, 696, filed May 2, 2015, entitled "System and Method of Providing a Content Discovery Platform For Optimizing Social Network Engagements," which is incorporated by reference herein. With the platform described in that application, the platform collects social media data, RSS feeds and articles, creates URL summarization documents from the collected data, creates features for capturing different aspect of an article's relevance using machine learning and trains models on subsets of articles to determine the weights for each feature. Models may be trained with different objectives. For example, the models may be trained to optimize for different social network user interactions such as favorites, likes, clicks, user shares, audience reactions etc. The described platform given topics scores the URL summarization documents (URLs) using the trained models and the top articles are retrieved in order of score (rank) and presented to the user. Topics may for which content is uncovered may be manually selected by user, or system can leverage automatically assigned topic of users expertise, or aggregate audience topic interest. Examples of topic generation is disclosed in U.S. patent application Ser. No. 14/627,151, filed Feb. 20, 2015, entitled "Domain Generic Large Scale Topic Expertise and Interest Mining Across Multiple Online Social Networks" which is incorporated by reference herein. Module 206 communicates with content database 216. Content discovery module 206 is described in more detail below. Also, content discovery may be tuned to brand owned content where data is sourced only by the brand owned web property some of which may include blogs, communities (e.g., via Lithium Technologies, Inc. Community Platforms) etc.

Scheduling module 208 is a module that functions to schedule to determine an optimal time to post content (e.g., a message) within a specified time period in order to maximize the probability of receiving reactions from audience members. This module also performs user personalized schedule generation (also known as auto-scheduling) including estimating audience reaction, domain specific schedule personalization (tuning) and user strategy for scheduling multiple posts. This is described in more detail below.

Security—authorization and approval module 210 is a module that functions to provide security layers or levels at different stages of the process of posting content. Module 210 for example enables a user to identify authorized users to approve and post content.

Data analytics engine module 212 is a module that functions to provide data metrics with those audience members that react to a user's posted content. For example, the data analytics engine may analyze all reactions for forecasting results.

User account database 214 is a database, as known to those skilled in the art, that stores user account credentials for platform 200 as well as social networks in which users desire to post content for audience member reaction.

Content database 216 is a database, as known to those skilled in the art, for storing content generated by discovery module 206.

Schedule database 218 is a database, as known to those skilled in the art, for storing schedules generated by the scheduling module 208.

The databases described on one form of data storage but those skilled in the art know that any data storage or strategy other than a database be used for storing the data disclosed in this disclosure.

Figure 3:
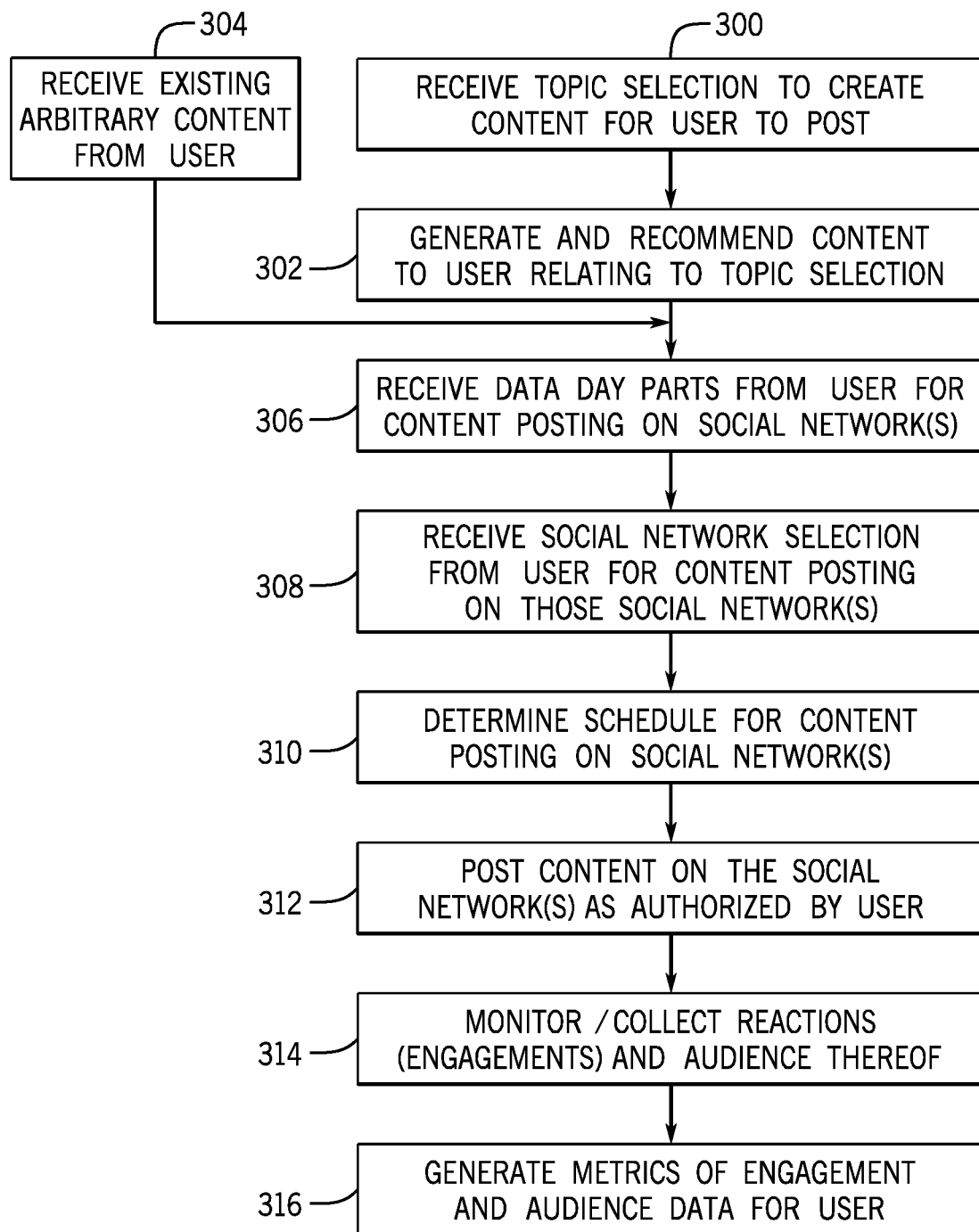
FIG. 3 depicts example method steps for implementing the software modules shown in FIG. 2.

FIG. 3 depicts example high-level method steps for implementing the software modules shown in FIG. 2. In particular, execution begins at step 300 wherein a user selected topic is received to create content for a user to post to one or more social networks. Execution proceeds to step 302 wherein content discovered relating to the selected topic is generated. Simultaneously (or alternatively), existing arbitrary content is received from the user at step 304. Now, regardless of the origination of content, execution proceeds to steps 306 and 308 wherein data day parts from the user are received for content posting on the one or more social network(s) and wherein selected social network(s) in which the user desired to paste content are received.

Next, once the content, day parts and social network selections are received from the user, execution proceeds to step 310 wherein a schedule for posting the selected content on the social networks is determined (by scheduling module 212). That is, the schedule is formulated to determine the optimal time to post content (e.g., a message) within a specified time period in order to maximize the probability of receiving reactions from audience members. Optionally, schedule determination may include estimating audience reaction (on one social network as a function of reaction on another), domain specific schedule personalization (tuning) and user strategy for scheduling multiple posts. This is described in more detail below. Execution proceeds to step 312 wherein the selected content as authorized by the user is posted on the social network(s). Following, the number of reactions (engagements) and the number of audience members that post such reactions are monitored (collected) at step 314 and analyzed (by data analytics engine 212). Metrics for such data are generated and displayed for the user to review. This is described in more detail below.

Figure 4:
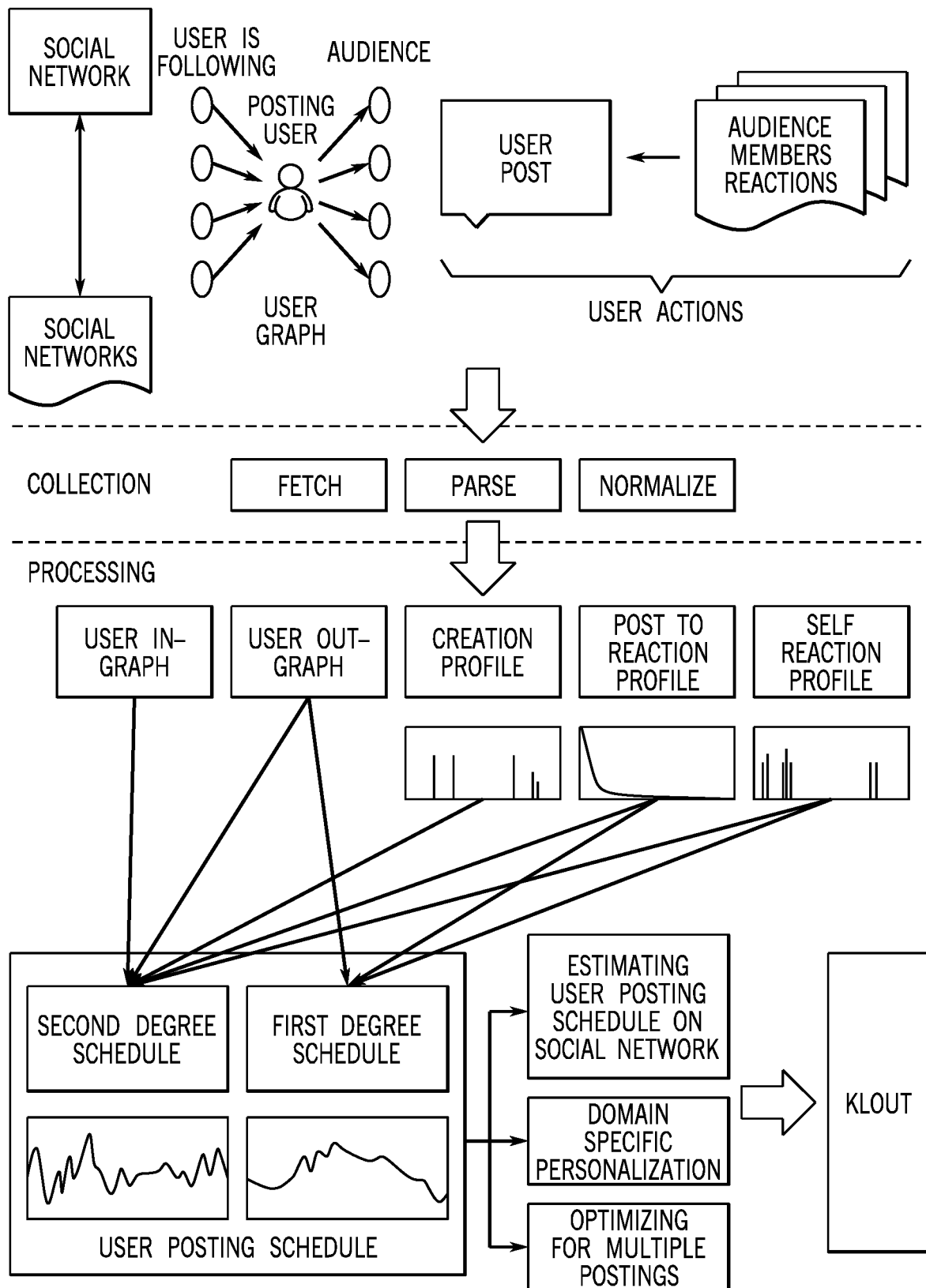
FIG. 4 depicts an example diagram illustrating salient flow to support the operation of the platform for managing a campaign for publishing data content on social networks.

FIG. 4 depicts an example diagram illustrating salient flow to support the operation of platform 200. Along the top of FIG. 4, a posting user is shown with a plurality of followers or connections (also referred to as audience or audience members) and individuals for whom the posting user is following. As known to those skilled in the art, the user posts content on social networks 104 and the user's audience (members) view and react to the posted content (audience member reactions). It then follows that a posting user is associated with his or her own user (data) graph (user graph) that comprises several sources of data including data relating to user followers (i.e. who is following the user in these social networks and (2) data relating to those past interactions with the user in a previous time frame on these social networks. Platform 200 employs collectors to collect the data from nodes relating to the interactions and user graphs including fetching, parsing and normalizing the data as known to those skilled in the art. Specifically, the data is collected and written to a cluster of nodes such as a Hadoop cluster that uses HDFS or other known to those skilled in the art as the file system, a data store such as HBase and an infrastructure such as Apache Hive or another known to those skilled in the art to process, query and manage the large datasets. Utilities such as Java functions to process user locations and time zones and operators and operators such as discrete convolution to process time-series vectors. The system allows proper mapping and ability to analyze billions content (i.e., messages) posted to social network platforms every day.

Platform 200 will process user (data) graph as user in-graph data and user out-graph data User out-graph data is data relating to those who follow a posting user and user in-graph is data relating to those following the posting user as known to those skilled in the art. With Facebook for example, the in-graph data and out-graph data are typically the same for followers known as "friends" but different for those following (use designated as a "like") a specific Facebook branding pages like Nike's Facebook page.

Platform 200 will process the user graph data to generate a creation profile, a post to reaction profile and self reaction profile. For each posting user, a creation profile is created that represents the posts created by the user in each time bucket. As described below, a time bucket is short period of time (e.g., 15 minutes). The self reaction profile represents the user responses or reactions to the post that a user sees. The post to reaction (filter) profile (PTR(x)) represents a discrete probability distribution over the event that a reaction occurs within a time interval. Each of these three profiles are depicted below their respective blocks as graphs in FIG. 4.

The user-out graph, post to reaction profile and reaction profile are used to generate or estimate a user schedule for posting content. The user schedule is essentially broken down into two types of schedules: first degree schedule for posting content and a second degree schedule for posting content. In order to distinguish between the two schedules, an example is in order. As part of a social graph as known to those skilled in the art, user $u_0$ for example has audience of other members $a_1$ so $U_{out}(u_0)=\{a_0, a_1, \ldots a_m\}$. So, when $u_0$ creates a post on social network (x), the post may be seen by potentially all audience members $a_i$ of her audience. Now, a sample audience member $a_0$ of $u_1$ also belongs as an audience member of other users $b_i$ and may view posts that are created by each of those users. This relationship between the users as $U_{in}(b_0)=\{u_0, u_1, \ldots u_m\}$. So, to derive the post schedule $S(u_1)$ for user $u_1$, first degree schedule and a second degree schedule for posting content are two different approaches to calculating the expected number of reaction received from $U_{out}(u_0)$ for a post created in the time bucket t.

This first degree schedule takes into account the reactions of $u_0$'s audience $U_{out}(u_0)$, ignoring the second degree effects of the other posting users $u_i$. The sum of delayed reactions per bucket t gives us the estimated audience reaction profile $Q(u_0)$ for the user as described in more detail below, where the elements of the vector are given by:

$$q_k(u_0) = \sum_{j=0}^{m} r_{d,t}(a_j)$$

where $r_d$ is the delayed reaction profile $R_d$ for an audience as described in detail below.

Thus in this case, the probability of receiving a reaction in any given time bucket $t_k(u_0)$ can then be computed from the audience post reaction profile $Q(u_0)$ as described in detail below. These probabilities determine the first degree reaction posting schedule $S_1(u_0)$ as known to those skilled in the art.

The second degree schedule is estimated to account for cognitive overload of posts as depending on other user from which audience members are following. In short, a user desires that his/her post is visible to the audience for as long as possible. The second degree schedule is an estimate or function to account for that effect. The actions of the users $u_i$ above represent the second degree effects for user $u_0$, since they affect how $u_0$'s first degree connection $a_0$ reacts to messages. To consider these second-degree effects, a second-degree reaction schedule $S2(u_0)$ is derived from knowledge of the time when the users $u_i$ create posts, a time when a specific audience member $b_0$ reacts to the posts create by $u_i$ and the probability that $b_0$ reacts to a post in a certain time bucket t. Second degree schedules are described in detail in "When-To-Post on Social Networks," Spasojevic et al., Association For Computing Machinery 2015, which is incorporated by reference herein. Therefore it will not be discussed here. For now, these two posting schedules will be described as the user posting schedule for simplicity.

Now, with the user posting schedule along with the other calculated data, platform 200 will perform several functions including (1) estimating a user posting schedule on one social network based on the estimated schedule on another social network (2) domain specific personalization and (3) optimizing for multiple postings. The results of all of these functions are presented to the posting user through any system that incorporates platform 220 such as the Klout (from Lithium Technologies, Inc.) system. All of this is described in detail below.

(1) Estimating a User Posting Schedule on One Social Network Based on Estimated Schedule on Another Social Network.

Figure 5A:
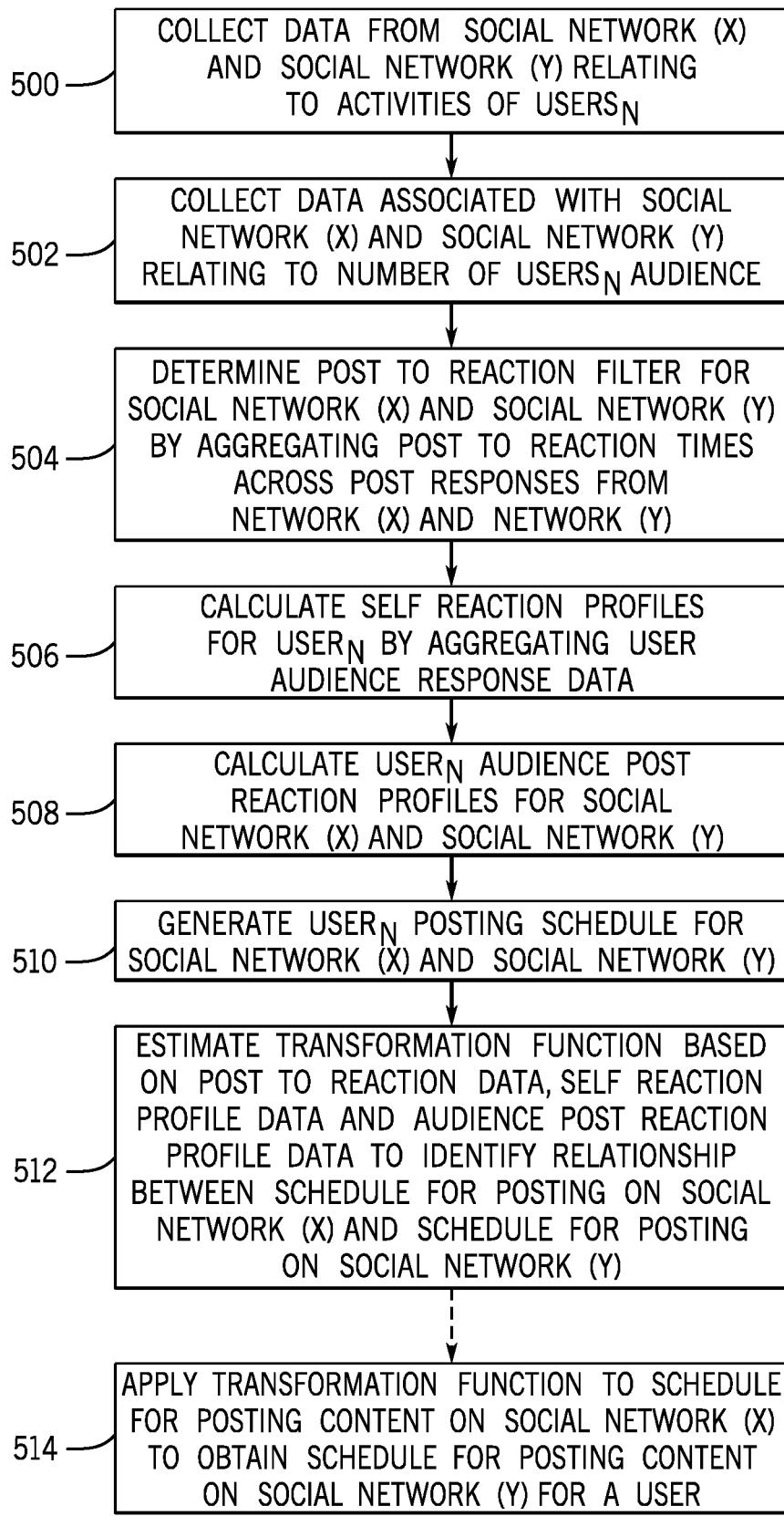
FIG. 5A depicts certain example method steps of the scheduling module for estimating a user's posting schedule on one social network as a function of the user's posting schedule from another social network.

As indicated above, find the best times personalized for the user to post content on social networks in order to increase audience member responses. Platform 200 formulates schedules for users to post content on these social networks based on user data relating to user behavior on those social networks to optimize audience reaction. However, data collection from private social networks (e.g., Facebook, Instagram etc.) may be difficult to achieve. Hence, the ability to estimate or calculate a schedule for posting content on a private social network on the basis of user data collected on a public social network (e.g., Twitter). FIG. 5A depicts example method steps performed by the scheduling module for estimating a particular user's posting schedule on a first social network (x) as a function of the user's posting schedule from another (second) social network (x). (Social networks (X) and (Y) in figures.) That is, the calculated function will enable a user to schedule posted content on the second social network based on data collected and subsequently analyzed from first social network (x) typically a public social network such as Twitter alone. Now, in order to calculate this function (as defined in step 512), platform 200 must first formulate posting schedules on the first and second social networks (y) and (x) for a sample set of users (typically large) and then the estimation can be achieved. In brief, this formulation takes into account user behavior in terms of post-to-reaction times and compares cross-network reaction behavior for users on the first and second networks.

Returning to FIG. 5A, execution begins at step 500 wherein data from social network (x) and social network (y) relating to the activities of a number of users$_N$ are collected. (Note that access to and collection of a user activities are easily obtained or retrieved from public social networks such as Twitter without user authorization (i.e., user login credentials). Access and collection of a user's activities on private sites such as Facebook are authorized by the user to third-party platforms such as Klout or others as known to those skilled in the art.) Users$_N$ may have one million or more users, but those skilled in the art know that any amount large enough to achieve desired results may be used for this method. These activities are user posts and reactions or responses to the user posts. Execution then proceeds to step 502 wherein users$_N$ audience data associated with social network (x) and social network (y) is collected. The audience data associated with social network (x) and social network (y) includes (1) the user's followers (audience), i.e., who is following the user on these social networks and (2) past actions of the user, and 3) interactions among the user and the followers in a previous time frame on these social networks. The data is collected via an API or other interface as known to those skilled in the art.

Execution proceeds to step 504 wherein a post to reaction filters PTR (x) and PTR (y) for social network (x) and social network (y) are (estimated) determined by aggregating post to reaction times across (for any number of user) post responses from social network (x) and social network (y). The post to reaction filter PTR (x) of social network (x) for example is a vector with a value in each bucket as follows PTR(x)={ptr(x, $b_0$), ptr(x, $b_1$), . . . , ptr(x, $b_i$), . . . } where the value ptr(x, $b_i$) is the probability that a reaction occurs within at bucket bi after a post is posted in network x. ptr(x, b) is calculated by looking at time content (e.g., message) is posted and time of reaction. The difference (delta) is used to create a histogram or distribution function as known to those skilled in the art. One example is described in "When-To-Post on Social Networks," Spasojevic et al., Association For Computing Machinery 2015, which is incorporated by reference herein.

- A bucket (b) is a short period of time, i.e., 15 minutes, 1 hour.
- T is a longer period of time (than a bucket), in which behavior patterns may repeat and therefore can be generalized. It may be a day, a week, month, year etc.
- x represents social network, such as Twitter and Facebook.
- T can then be divided into buckets and represented as ($b_0$, $b_1$, . . . , $b_i$, . . . ). For example, if T is a day and each bucket is an hour, then $b_0$ represent the first hour of a day and $b_{23}$ represent the last hour of a day.
- u is a user who posts in one or multiple networks.

PTR(y) is similarly determined as PTR(y)={ptr(y, $b_0$), ptr(y, $b_1$), . . . , ptr(y, $b_i$), . . . } with similar definitions except y is the social network (y).

Execution proceeds to 506 wherein self reaction profiles R(u,x) and R(u,y) for the users$_N$ on social networks (x) and (y) are calculated by aggregating user audience member response (reaction) data. For example, given T, R(u,x) represents the self reaction profile of user u in social network x and R(u, x) represents a vector of values in each bucket as follows:

$$R(u,x)=\{r(u,x,b_0), r(u,x,b_1), \ldots, r(u,x,b_i), \ldots\}$$

G(u, x) represent audience members of user u in network x.

a∈G(u, x) an audience of user u in network x.

R(u, y) is calculated using the similar vector and definitions. There is usually a time an audience member reaction is mapped into buckets. Thus, a specific post may be visible in one time bucket but may only be reacted upon in a later time bucket in R(u, x). The post to reaction filter PTR(x) function represents the lag in terms of a time interval d. Therefore a delayed reaction profile for a user is computed by performing a discrete convolution operation of the original reaction profile R(u,x) with the post to reaction filter function PTR(x) is as follows:

$$R_d(u,x)=R(u,x)*PTR(x)$$

where * is a discrete convolution function as known to those skilled in the art. See for example, "When-To-Post on Social Networks," Spasojevic et al., Association For Computing Machinery 2015, which is incorporated by reference herein.

Execution proceeds to step 508 wherein the user$_N$ audience post reaction profiles (data) Q(u, x) and Q(u, y) (also referred to as audience reaction profile) for social networks (x) and (y) are calculated. For example, for a given T, Q(u, x) is the audience post reaction profile for user u in network x and Q(u, x) has a vector of values, each of which is associated with each bucket b as follows:

$$Q(u,x)=\{q(u,x,b_0), q(u,x,b_1), \ldots, q(u,x,b_i), \ldots\}$$

The value q(u, x, b) is the likelihood of an audience would respond to a post on social network (x) from user u posted at time bucket $b_i$. q(u, x, $b_i$), is calculated by aggregating individuals as known to those skilled in the art. The aggregation appears as follows:

$$q_i(u, x, b_i) = \sum_{a \in G(u,x)} r_d(a, x, b_i)$$

One example is described in "When-To-Post on Social Networks," Spasojevic et al., Association For Computing Machinery 2015. $R_d$(a, x)={$r_d$(a, x, $b_0$), $r_d$(a, x, $b_1$) . . . $r_d$(a, x, $b_i$) . . . }. $R_d$(a, x) is the delayed reaction profile for the audience.

Execution proceeds to step 510 wherein user$_N$ posting schedule S(x, u) and S(y, u) for social networks (x) and (y) are generated. Once Q(u, x) is determined, a probability mass function can be determined which represents a post data schedule for the user. These probabilities can be computed as follows:

$$s_i(u, x, b_i) = q_i(u, x, b_i) \bigg/ \sum_{j=1}^{N} q_j(u, x, b_j)$$

The vector consisting of the probabilities determine the post schedule of the user. This vector is represented as S(x, u)={$s_1$(u, x, $b_1$), $s_2$(u, x, $b_2$), $s_3$(u, x, $b_3$) . . . $s_i$(u, x, $b_i$) . . . }. Once S(u, x) is obtained, the bucket with the highest value of $S_i$(u, x, $b_i$) is best time to post.

Figure 5B:
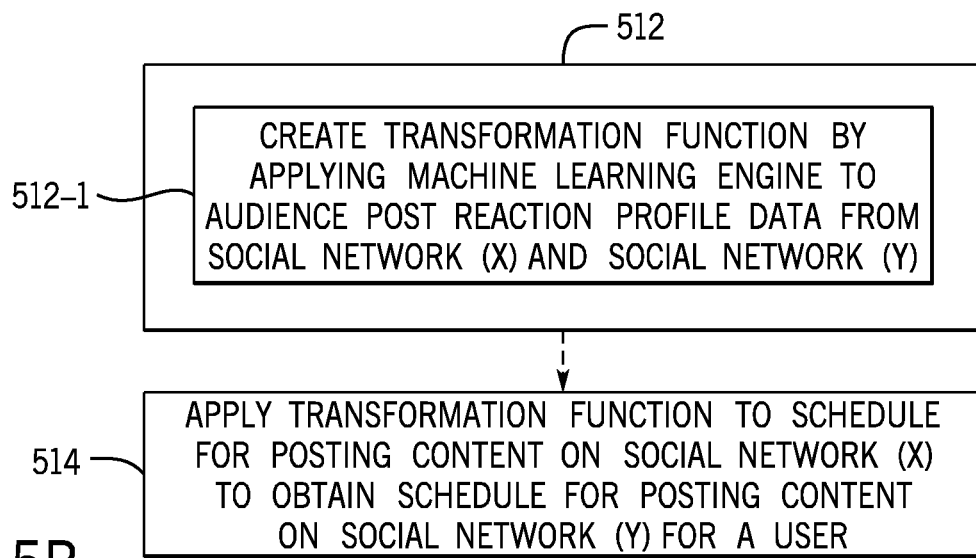
FIGS. 5B-D depict various embodiments of certain method steps in FIG. 5A.
Figure 5C:
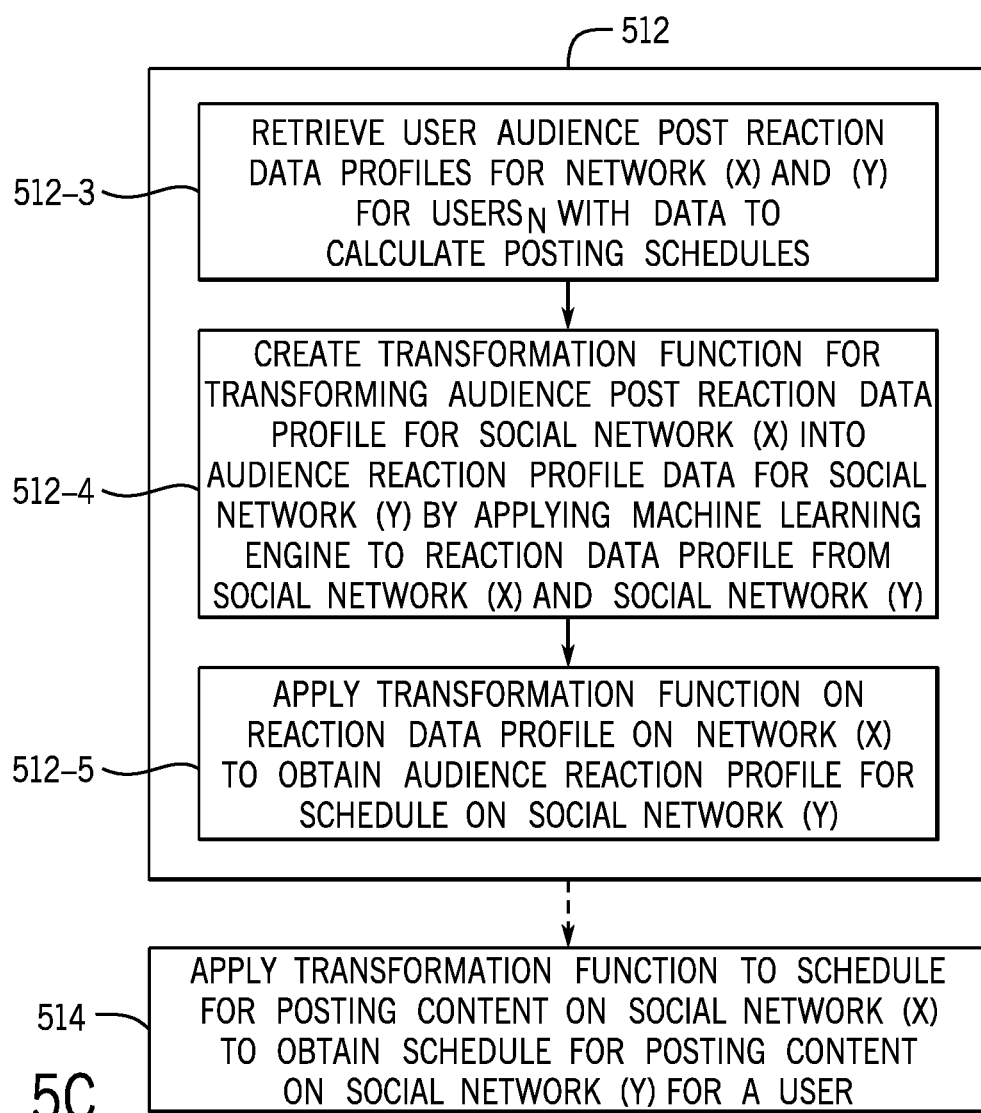
Figure 5D:
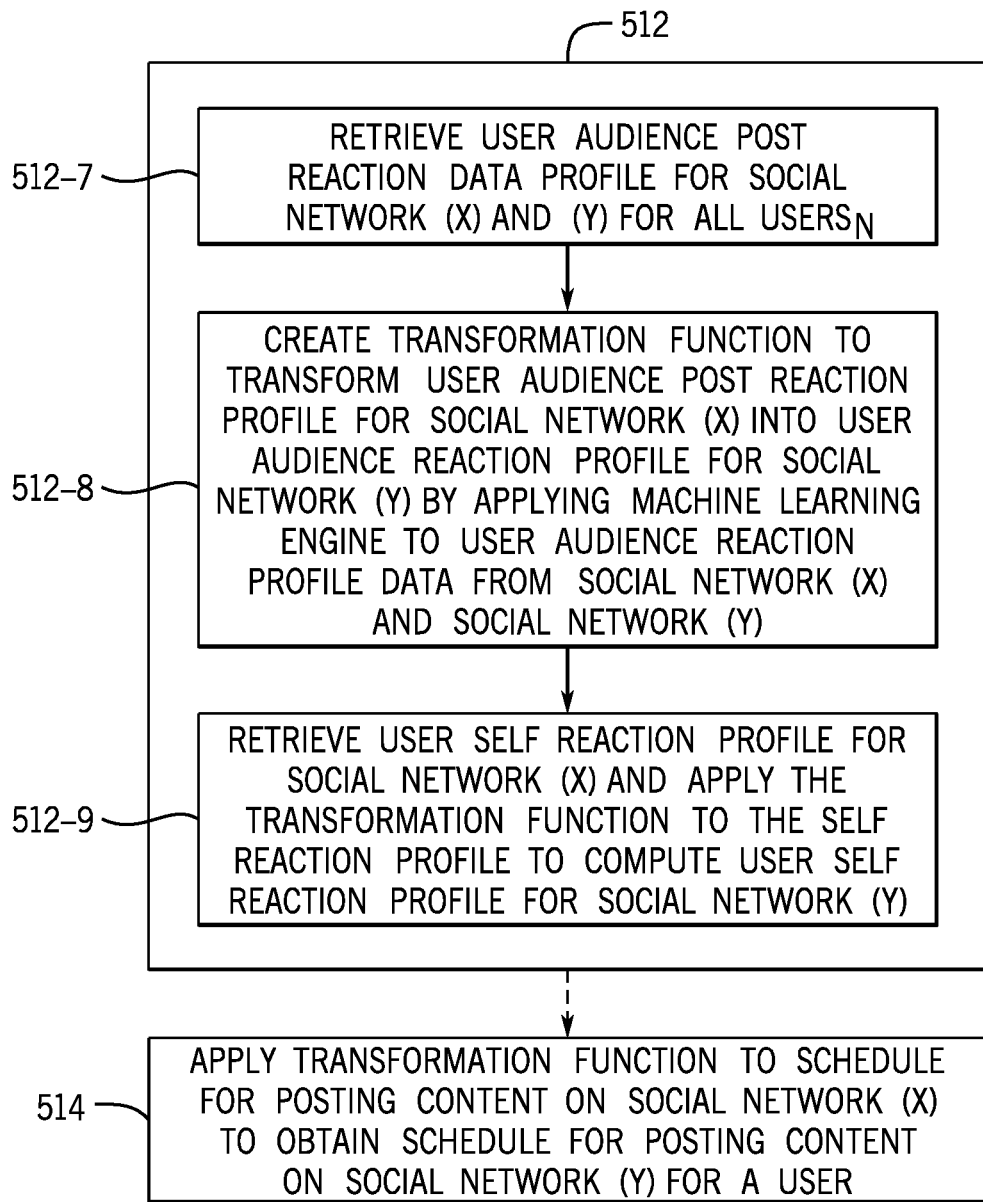

Execution proceeds to step 512 wherein a transformation function is estimated, based on the post to reaction filter data, self reaction profile data and the audience post reaction profile data, to transform the data underlying the schedule for posting content on social network (x) to data underlying the schedule for posting content on social network (y). In other words, the transformation function actually establishes or identifies a relationship between a schedule for posting content on social network (x) and a schedule for posting content on social network (Y). This is represented as S(y, u)=F(S(x, u)) where S(x, u) is the schedule for posting on social network (x) and S(y, u) is the schedule for posting on social network (y). At this point, a goal at this step is to create the function F that is necessary to transform the posting schedule for social network (x), i.e., transform the data underlying that schedule, into the schedule S(y, x) for posting on social network (y) for all users$_N$. Step 512 may be accomplished in several ways. FIGS. 5B-D depict various ways or embodiments of executing this step as described below.

Now that the transformation function F has been established, any user "u" may apply it to a schedule for posting content on social network (x) to obtain the schedule for posting content on social network (y) as shown in step 514. This step 514 in effect estimates the schedule for posting content on social network (y) using the transformation function on the schedule data for posting content on social network (x). However, in order to apply step of 514 for a particular user, the basic steps 500-510 must first be executed to determine a schedule S(u, x) for posting content on network (x) for that particular user. This is represented by the dashed lines in FIG. 5A. Then, the schedule S(u, y) for posting content on social network (y) may be calculated for that particular user. This is described in greater detail below.

In one particular embodiment shown in FIG. 5B. In step 512-1, the transformation function F is created by applying a machine learning engine to the audience post reaction profile data Q(u, x) and Q(u, y) for the samples on both social networks (x) and (y). An exemplary regression method is linear regression as follows:

$$S(u,y)=M*S(u,x)+B$$

where M is a matrix and B are vectors and both are learned from the samples as known to those skilled in the art. Execution proceeds to several steps (similar to steps 500-510) including step 514 as described above (wherein the transformation function is applied etc.).

In yet another embodiment as shown in FIG. 5C, execution proceeds to step 512-3 wherein (any user) audience post reaction data profiles Q(u, x) and Q(u, y) (already calculated and stored) are retrieved for users$_N$ with data to calculate the schedules for social networks (x) and (y). Execution then proceeds to step 512-4 wherein a transformation function for transforming the audience post reaction data profile Q(u, x) for social network (x) into audience post to reaction data profile Q(u, y) for social network (y). To achieve this, the machine learning engine applies to the audience post reaction data profiles from the social networks (x) and (y) to estimate this function F by applying a regression method as described above. Once the function F is determined, it is applied to the audience post reaction data profile Q(u, x) to obtain audience post reaction data profile Q(u, y) at step 512-5 and from that the schedule S(u, y) may be calculated form Q(u, y). Execution proceeds to several steps (similar to steps 500-510) including step 514 as described above (wherein the transformation function is applied etc.).

In yet another embodiment as shown in FIG. 5D, execution begins at step 512-7 wherein user audience post to reaction data profiles Q(u, x) and Q(u, y) for social networks (x) and (y) are retrieved for all users on such networks. Execution then proceeds to step 512-8 wherein a transformation function F is created to transform the audience post reaction profiles Q(u, x) for social networks (x) and (y) into the audience post reaction profile Q(u, y). Function F is computed by applying a machine learning engine to the audience reaction profile data Q(u, x) and Q(u, y) for a large sample of users of social networks (x) and (y). Execution proceeds to step 512-9 wherein the self reaction profile R(u, x) for social network (x) is retrieved and then the function F is applied to R(u, x) to compute (estimate) the self reaction profile on R(u, y). Once the self reaction profile R(u, y) is computed, a user audience post reaction profile Q(u, y) is computed as well as the user schedule S(u, y) is computed based on Q(u, y), R(u, y) as described above (not shown in FIG. 5D). Execution proceeds to several steps (similar to steps 500-510) including step 514 as described above (wherein the transformation function is applied etc.).

Regardless of the embodiment used to estimate scheduling posts on social network (y), city, country and time zone-level schedules using platform 200 are aggregated. The time zones schedules may be used in the event there is insufficient data to generate a personalized schedule for the user.

As indicated above, any user "u" may apply the transformation function F (determined above) to a schedule for posting content on social network (x) to obtain the schedule for posting content on social network (y) as shown in step 514 in FIGS. 5A-5D. This step 514 in effect estimates the schedule for posting content on social network (y) using the transformation function on the schedule data for posting content on social network (x). However, in order to apply step of 514 for a particular user, the basic steps 500-510 must first be executed to determine a schedule S(u, x) for posting content on social network (x) for that particular user. Then, a schedule S(u, y) for posting content on social network (y) may be calculated for that particular user. An example of this appears below.

With the transformation function F in hand, a user such as Nike may desire to post content (e.g., articles) on the social network (y). Similar to step 500 in FIG. 5A, data is collected from social network (x) relating to the activities of Nike. Activities include Nike's (the user) posts and reactions or responses to the posts. Next, similar to step 502, data is collected that is associated with social network (x) relating to the number of Nike's audience. Next, similar to step 504, a post to reaction filter for social network (x) is determined. Then, similar to step 506, a self reaction profile is calculated for Nike (user) by aggregating Nike's audience response data. Now, similar to step 508, Nike's audience post reaction profile for social network (x) is calculated. Then, similar to step 510, Nike's schedule for posting content on social network (x) is generated. Now, in order for Nike to obtain a schedule for posting content on social network (y), the transformation function F (computed in FIG. 5A) is applied to the data underlying Nike's schedule for posting the content on social network (x) to transform that data into the schedule data for posting the content on social network (y). This is step 514 above.

(2) Domain Specific Schedule Optimization.

Figure 6A:
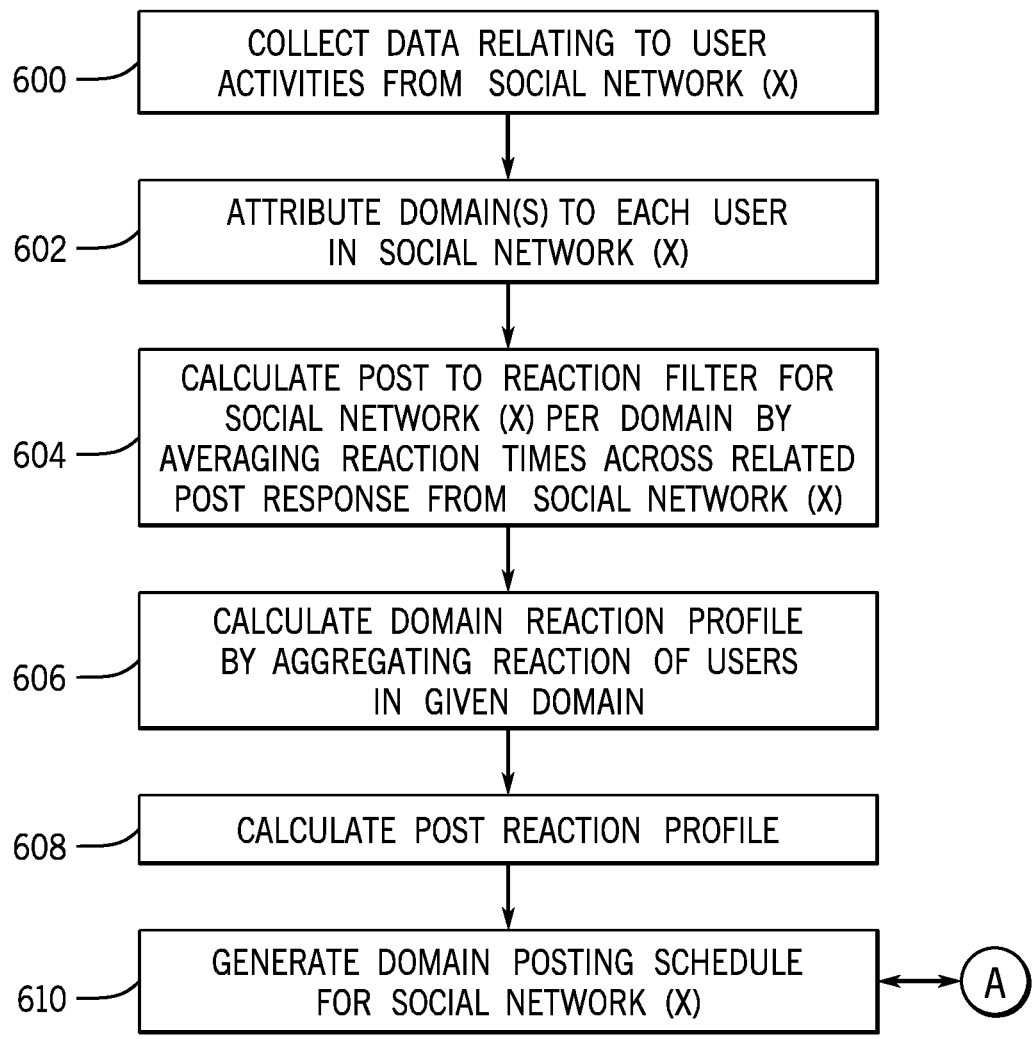
FIGS. 6A-6B depict example flow diagrams illustrating example method steps for generating a domain-specific post schedule for a user's audience.
Figure 6B:
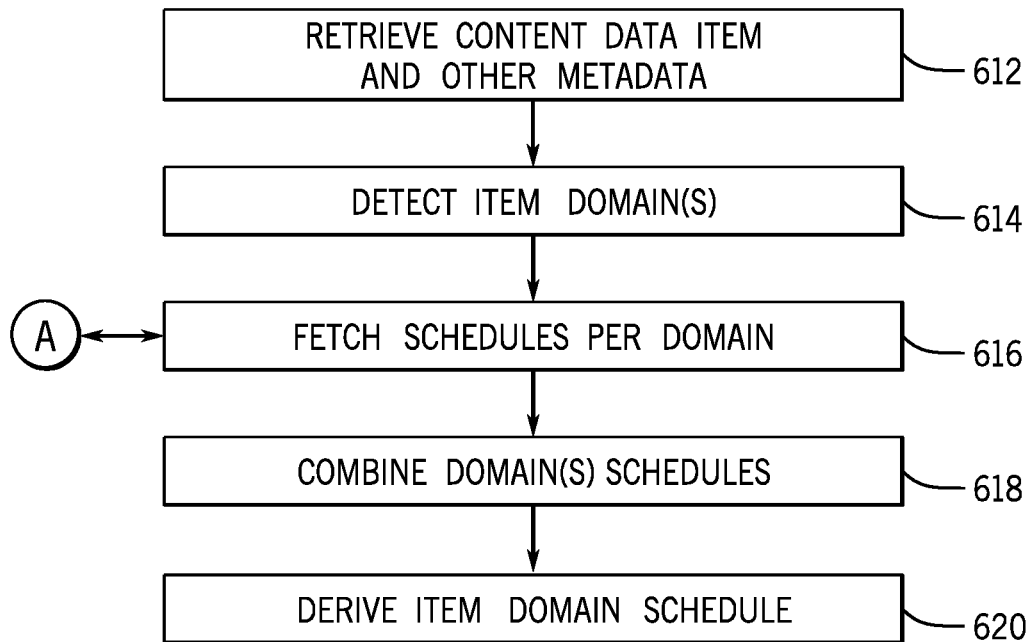

The schedules discussed above result in schedule personalization based on affinities of a user's audience members. However, personalization based on a user's audience member's characteristics can be generalized further. User interests and expertise with respect to topics may be generated as known to those skilled in the art. Now, platform 200 may also generate optimal schedules for users based on a mixture of topics or other domains, which may be derived from content being posted, the cumulative audience interest and/or poster's expertise, to elicit maximal reactions. This approach may work well where a lot of content reacted upon may not come from a first degree network but though discovery feeds on social networks. It is the domain, i.e., the nature of the post, that predicts potential audience behavior. FIGS. 6A-6B depict flow diagrams illustrating example method steps for generating a domain-specific post schedule for a user's audience (that is implementing the scheduling module 208 of platform 200).

Execution begins at step 600 wherein data relating to all users' activities are collected from social network (x). The activities relate to users' interactions, i.e., posts and responses or reactions to those posts on social network (x). (The interactions are defined as time of post, time of reaction, author, actor, content, network and other meta data associated with interaction.) As indicated above, access to and collection of user activities are retrieved on both public social networks such as Twitter without user authorization and private social networks such as Facebook with user authorization (OAuth tokens) to platforms such as Klout or others as known to those skilled in the art.

Execution then proceeds to step 602 wherein the domain(s) are attributed to each user in network (x). The domain may be a topic, time zone, geo-location based item, city, state, country or language (e.g., English or Spanish) or other domain as known to those skilled in the art.

Next execution proceeds to step 604 wherein a post to reaction filter PTR(D, x) for network (x) per domain is calculated. As described above, for a time internal d, the PTR(x) is a discrete probably distribution over the event that a reaction occurs within timed of creating a post on network (x). PTR (D, x) function is estimated to be the aggregating of the reaction times across all observed posts and reactions in network (x), domain (D).

Execution proceeds to step 606 wherein a "domain" reaction profile R(D, x) is computed for all users of social network (x) by aggregating the reactions of users in a given domain. The "domain" reaction profile R(D, x) is similar to R(u, x) described above except that it does not involve the audience of user and their reactions, but the reactions in context of the domain (e.g., reactions to content within domain, or reactions by people interested in domain). However, the similar calculation above for R(u, x) described above applies here.

Execution proceeds to step 608 wherein the domain post reaction Q(D, x) is calculated based on R(D, x) and PTR(D, x). The calculation performed is similar to Q(u,x) the above. In brief, a delayed reaction profile $R_d(D, x)$ is calculated as $R_d(D, x) = R(D, x) * PTR(D, x)$ where * is the discrete convolution operator as described above. The relationship and calculation of Q(D, x) as a function of $R_d(D, x)$ is described above so it will not be done here.

Now, execution proceeds to step 610 wherein a schedule for posting on the social network (x) is generated base on the domain post reaction profile Q(D, x) as described above. Hence, a user posting schedule is created for a domain. Steps 600-610 are continuously repeating as a batch during the operation of the platform 200.

Now, the flow steps in FIG. 6B are performed concurrently with the flow steps in FIG. 6A. Execution begins with step 612 wherein a content data item and other metadata are retrieved. A content data item may be an article, message or any other data item known to those skilled in the art.

Execution proceeds to step 614 wherein each and every domain are detected. A domain for example may be <sports>, <nightlife> etc. The domain may be auto-detected using a natural language processing (NLP) algorithm known to those skilled in the art. Alternatively, a domain may be selected by the posting user. For such detection, each data content item is analyzed for its metadata as described above (e.g., by subject matter) and a particular domain or more are detected. There may be one domain, e.g., a topic or several domains, e.g., cities.

Execution proceeds to step 616 wherein the schedules generated per domain in step 612 are fetched. The domain schedules are then combined at step 618. If there are schedules for more than one domain, the combination can be a simple schedule addition followed by normalization as known to those skilled in the art. For example, there may be a schedule for politics, sports and art, each having a particular waveform representing a posting schedule. These waveforms are added and then normalized. Then, execution proceeds to step 620 wherein a domain schedule is derived for the item. That is, a posting schedule for the particular item is generated.

(3) Optimizing for Multiple Posts.

If a user wishes to post several content items (e.g., messages), the user must be aware that posting multiple items could have a diminishing return on the posts, i.e., reduction in the number of reactions due to audience fatigue, if not timely (spaced) posted. For example, if Nike desired to post five messages within a day part, individual messages that appear in close proximity in time could lead to a reduction in reactions. Alternatively, the number of message may not be capable of posting within the day part if spaced too far apart. Accordingly, platform 200 will find an optimized time to post multiple content items (e.g., message or articles etc.).

Figure 7:
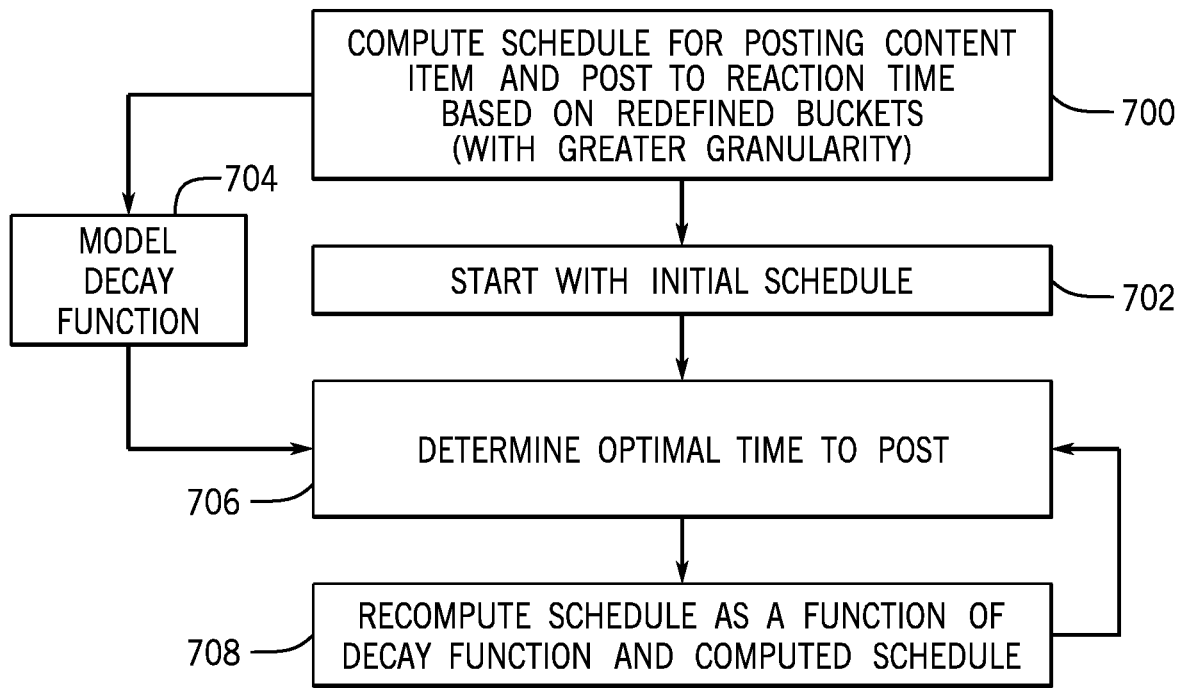
FIG. 7 depicts a flow diagram illustrating example method steps for optimizing the scheduling the posting of multiple content items.

FIG. 7 depicts a flow diagram illustrating example method steps for optimizing the scheduling of posting content items (that is implementing the scheduling module 208 of platform 200). Specifically, execution begins at step 700 wherein a schedule S for posting a content item and post to reaction time profiles PTR(t) are computed based on redefined buckets. In this instance, the buckets are redefined with greater granularity than before busing interpolation techniques on a bucket time graph as known to those skilled in the art. Initially, the buckets may be fifteen minute buckets. However, the redefined buckets may now be one minute buckets.

Figure 8:
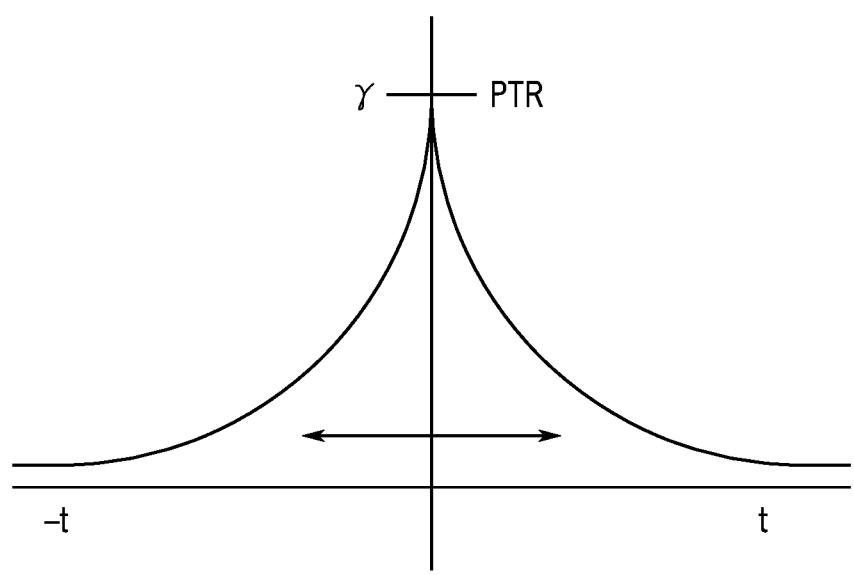
FIG. 8 depicts a graph of decay function expressed via post to reaction time function over time used for optimizing the scheduling the posting of multiple content items.
Figure 9A:
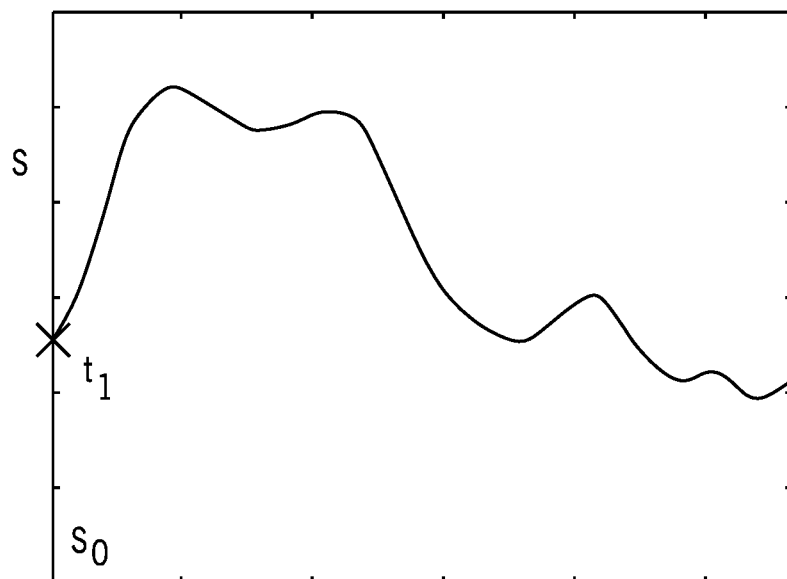
FIG. 9A-9F depict several graphs illustrating a series of revised schedules as a function of the previous postings.
Figure 9B:
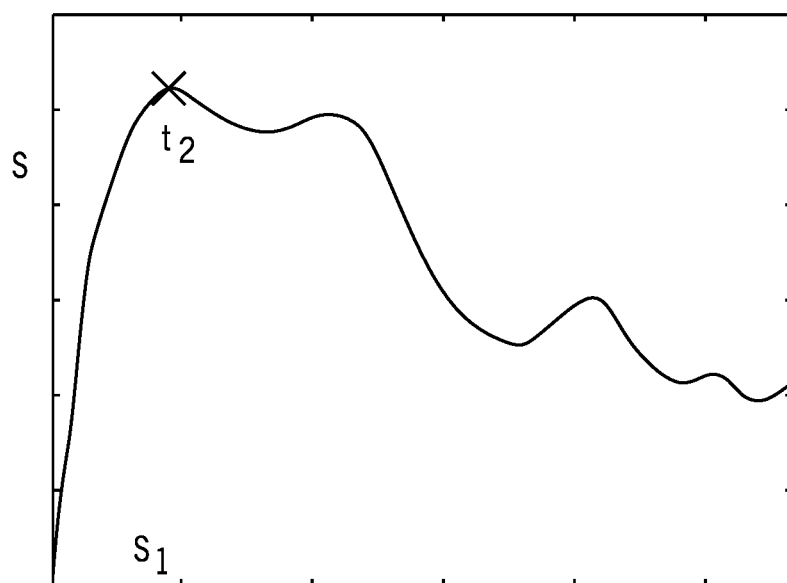
Figure 9C:
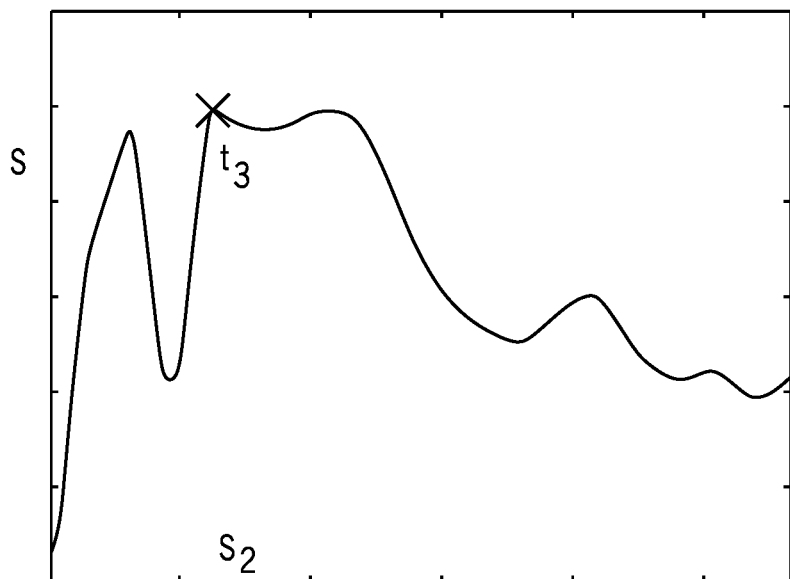
Figure 9D:
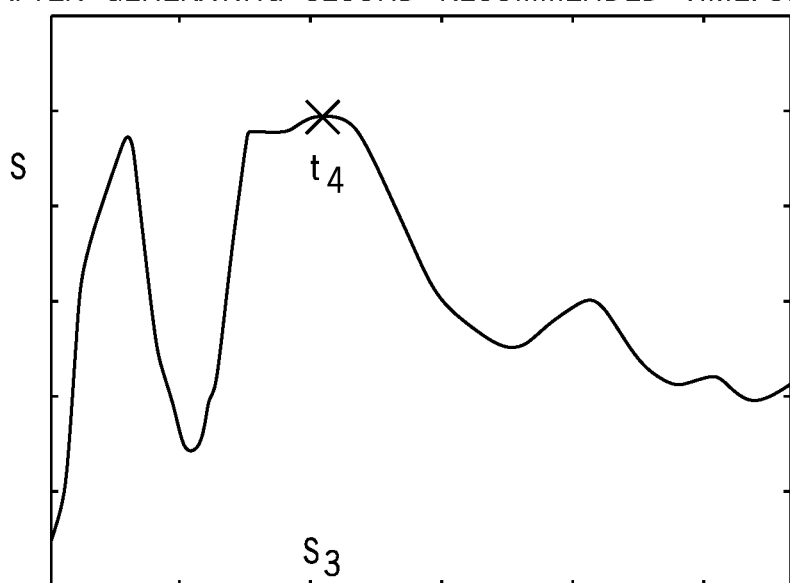
Figure 9E:
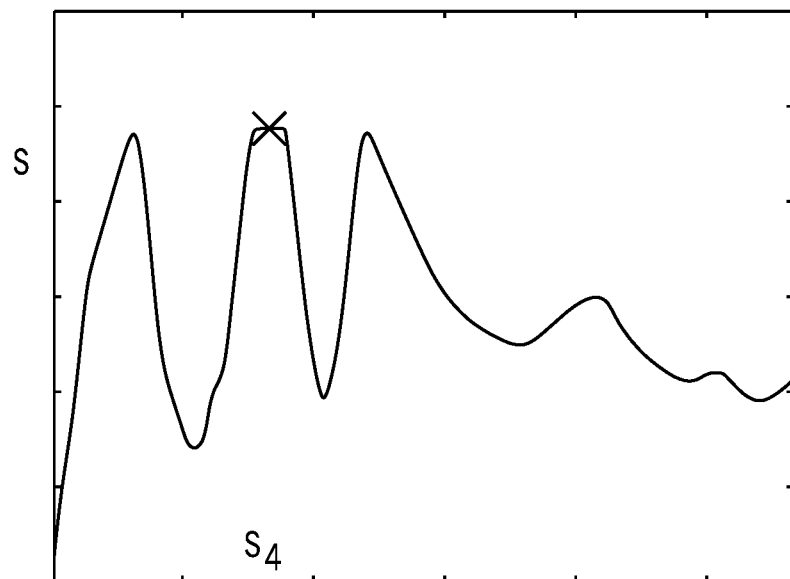
Figure 9F:
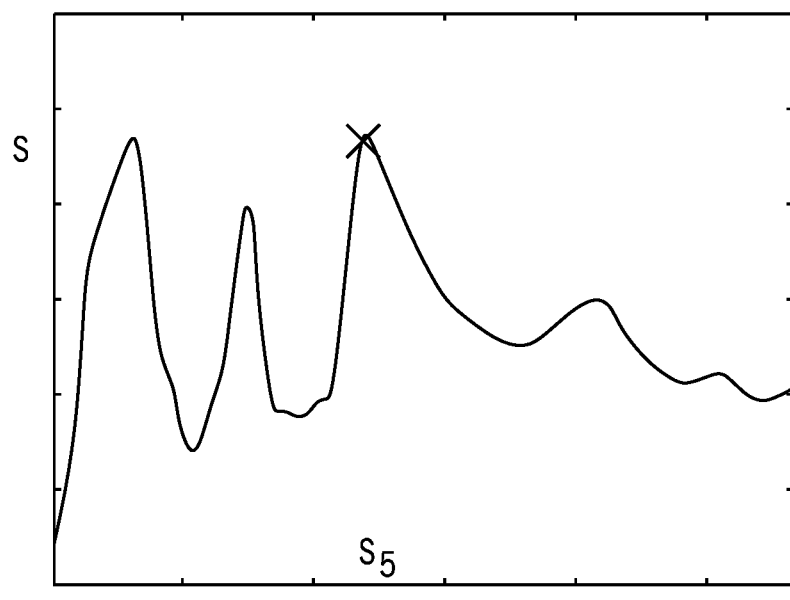

Execution proceeds to step 702 wherein an initial first schedule is selected. Step 702 may actually be incorporated into step 700 if desired. Simultaneously with respect to step 700, execution also proceeds to step 704 where a decay function is modeled. The decay function which represents function of fatigue of a content item with an audience member. Decay function could be derived in various ways or manually set to fit product needs, or user's expectation. In one implementation, decay values are calculated with the following decay function $F_\gamma$:

$$F\gamma = \begin{cases} t \geq 0, & \gamma \cdot PTR(t) \\ t < 0, & \gamma \cdot PTR(-t) \end{cases}$$

where (t=time) the post to reaction time PTR(t) is depicted in FIG. 8. FIG. 8 depicts a graph of decay function expressed via post to reaction time function over time for used for optimizing the scheduling the posting of multiple content items. PTR is depicted as at different times after and before (negative values). The negative values of t can translation to posting in the past relative to time as known to those skilled in the art.

γ is shown in FIG. 8 at the apex PTR(t). They is essentially used as a weighting function to establish weighted post to reaction values. Execution proceeds to step 706 wherein the optimal times to post data content items are determined. Initially, the time to post for schedule $S_0$ is $t_1$ as shown in FIG. 9A. (FIGS. 9A-9F depict several graphs illustrating a series of revised schedules as a function of the previous postings.) The schedules are a prediction of reactions to posts.) From this, execution proceeds to step 708 wherein the schedule $S_1$ is recomputed as a function of the decay function and prior schedule $S_0$. This is represented as follows:

$$S_j(t) = S_{j-1}(t) - F_\gamma(t - t_j) \text{ where } j = \text{index of number of previous posts}$$

$$F\gamma = \begin{cases} t \geq 0, & \gamma \cdot PTR(t) \\ t < 0, & \gamma \cdot PTR(-t) \end{cases}$$

as described above (in one implementation). Execution then returns to step 706 wherein an optimal time to post the next content item is determined. So, with the new schedule $S_1$ the time to post is selected at the highest point $t_2$ in the graph in FIG. 9B. This calculation loop continues and times to post are selected $t_3, t_4, t_5, t_6$ etc. for recomputed schedules $S_2, S_3, S_4, S_5$ etc. as shown in the graphs in FIGS. 9C-9F.

Figure 10:
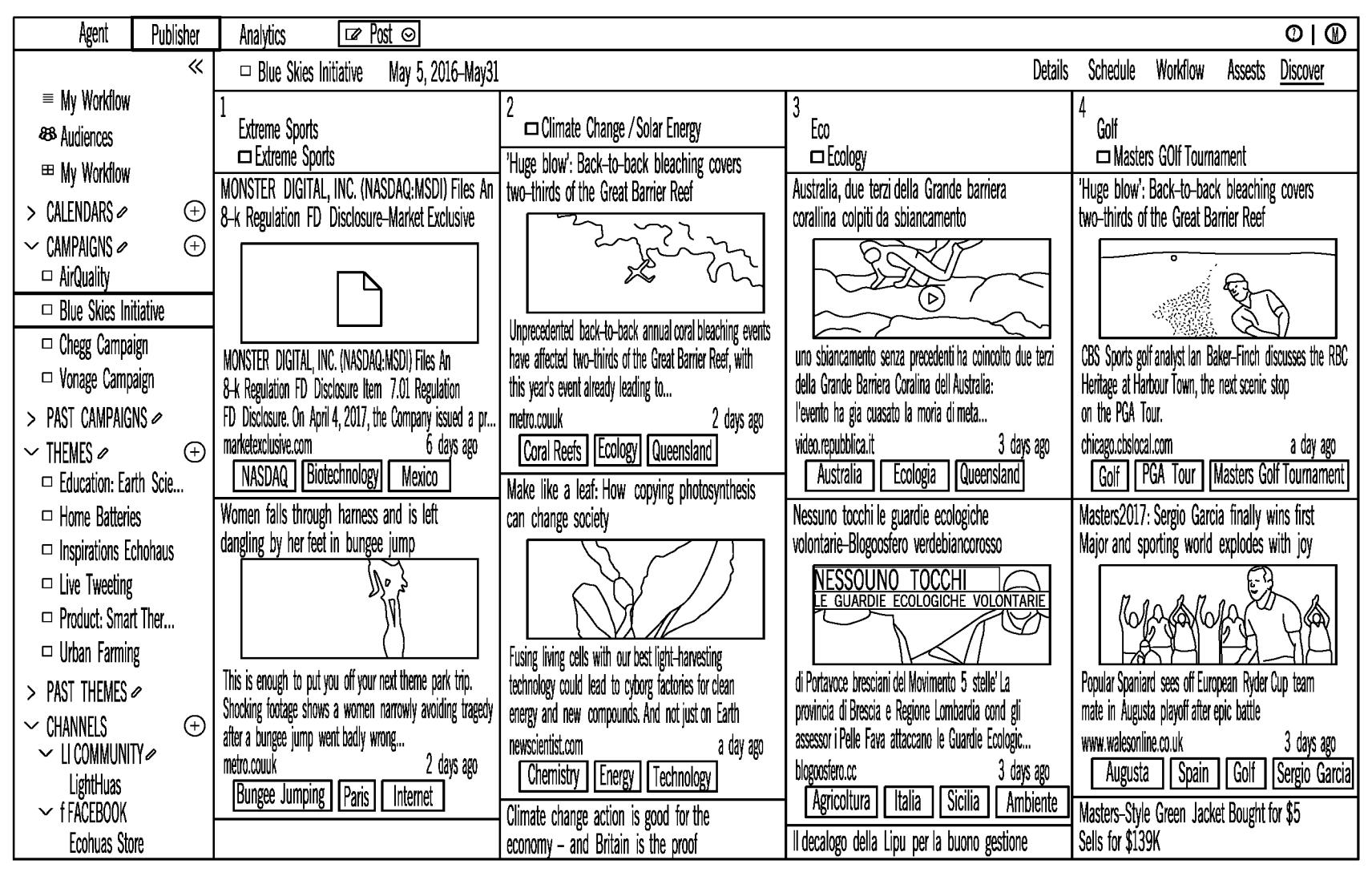
Figure 11:
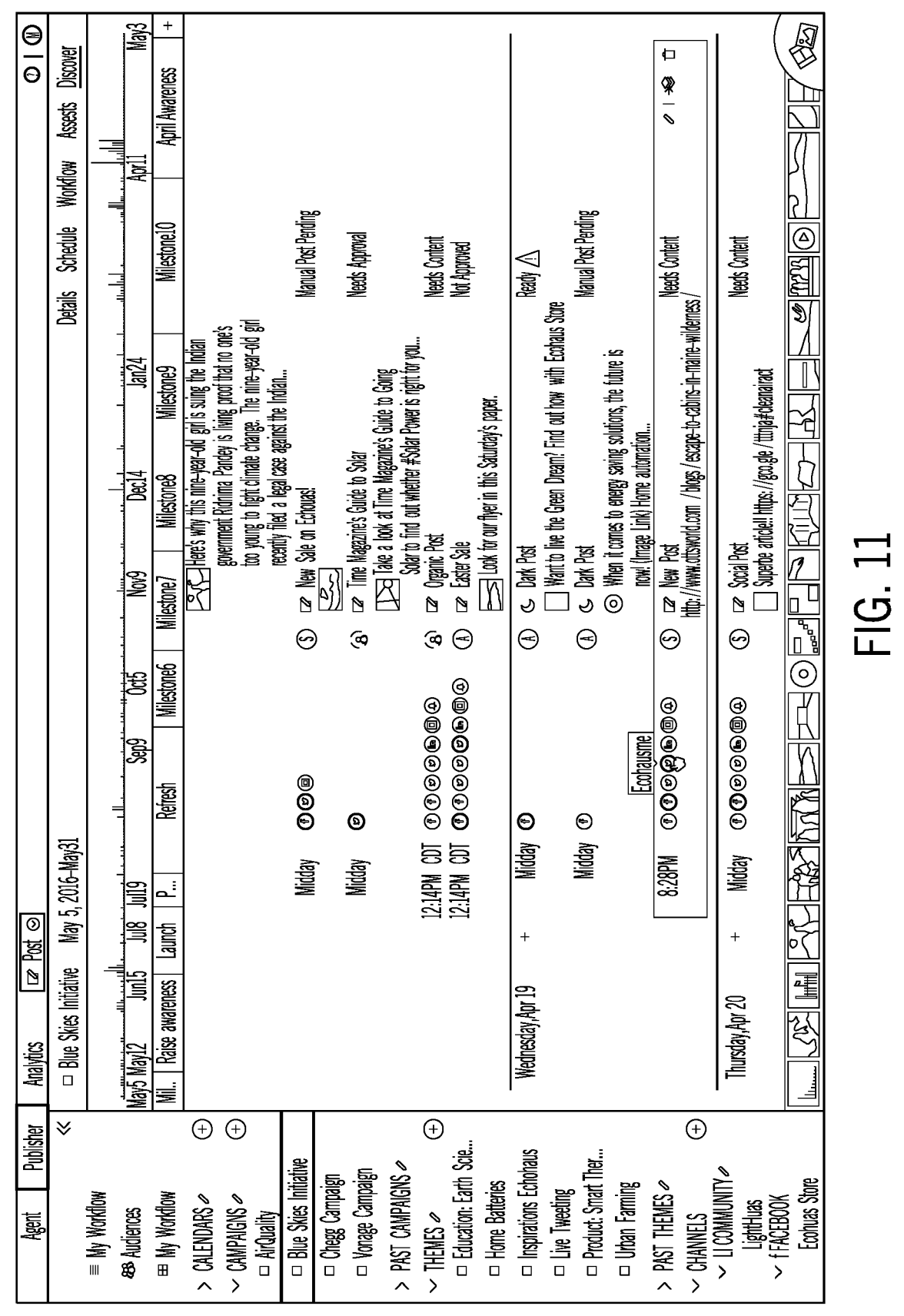

FIGS. 10-13 depict several screen shot representations of the platform for managing a campaign for publishing data content on social networks. In particular, FIG. 10 illustrates a part of the platform in which a user (posting user) is presented with options for content to post to the user's audience. A number of publishing campaign topics are presented as a list. A user may select one of several campaigns for posting content. In this example, "Blue Skies Initiative" is selected along with "discover" for discovering and viewing topics of content streams for example including sports and climate change that a user may select. FIG. 11 illustrates an example of screen in which the user has selected the days and day parts (time intervals) for posting content. In addition, FIG. 11 specifically illustrates a user selecting the specific social networks in which he/she wishes to post such content. In this instance, the user has selected several content items for posting midday for auto-scheduling using the platform algorithm and selected content to be posted at a specific time.

Figure 12:
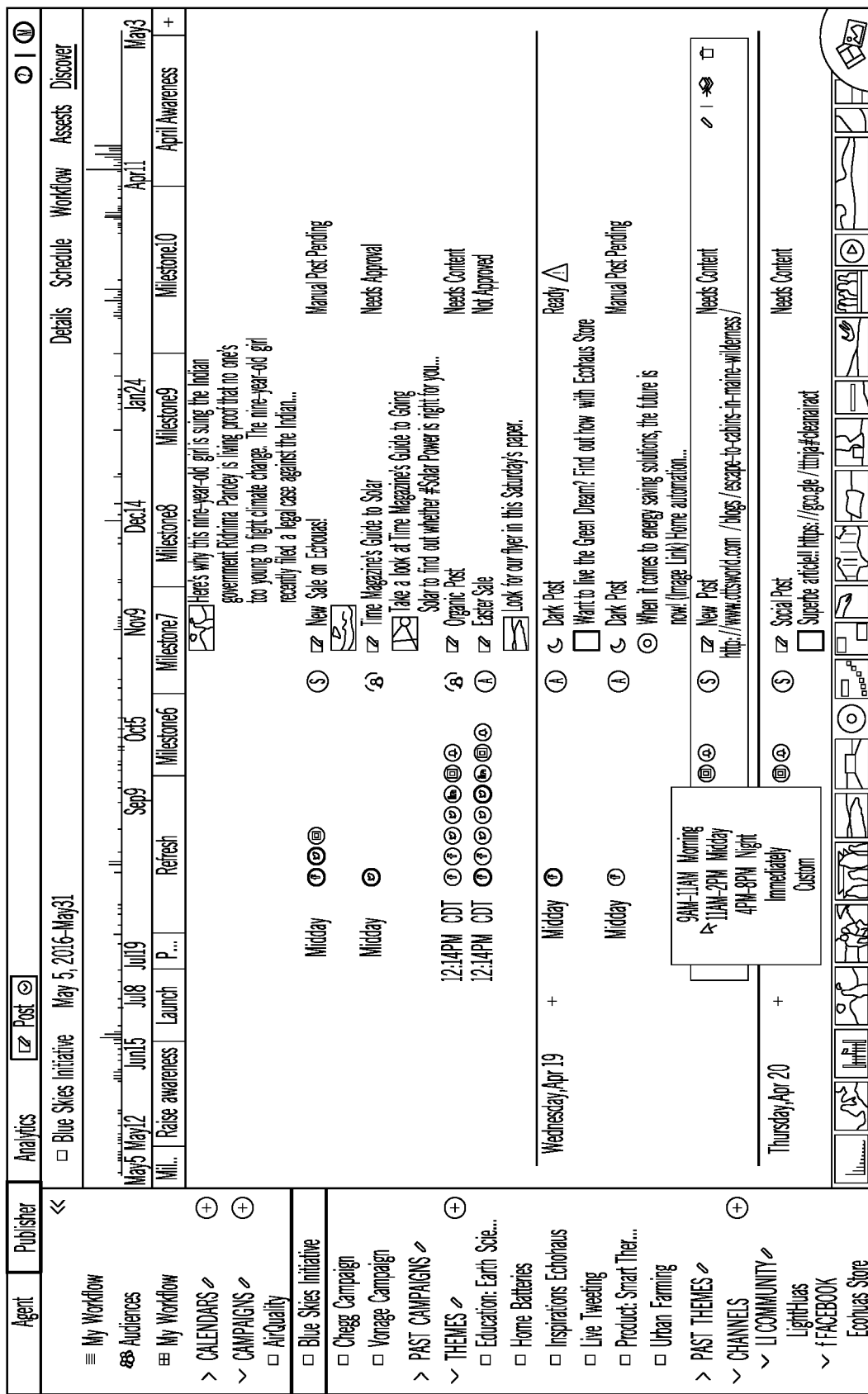
Figure 13:
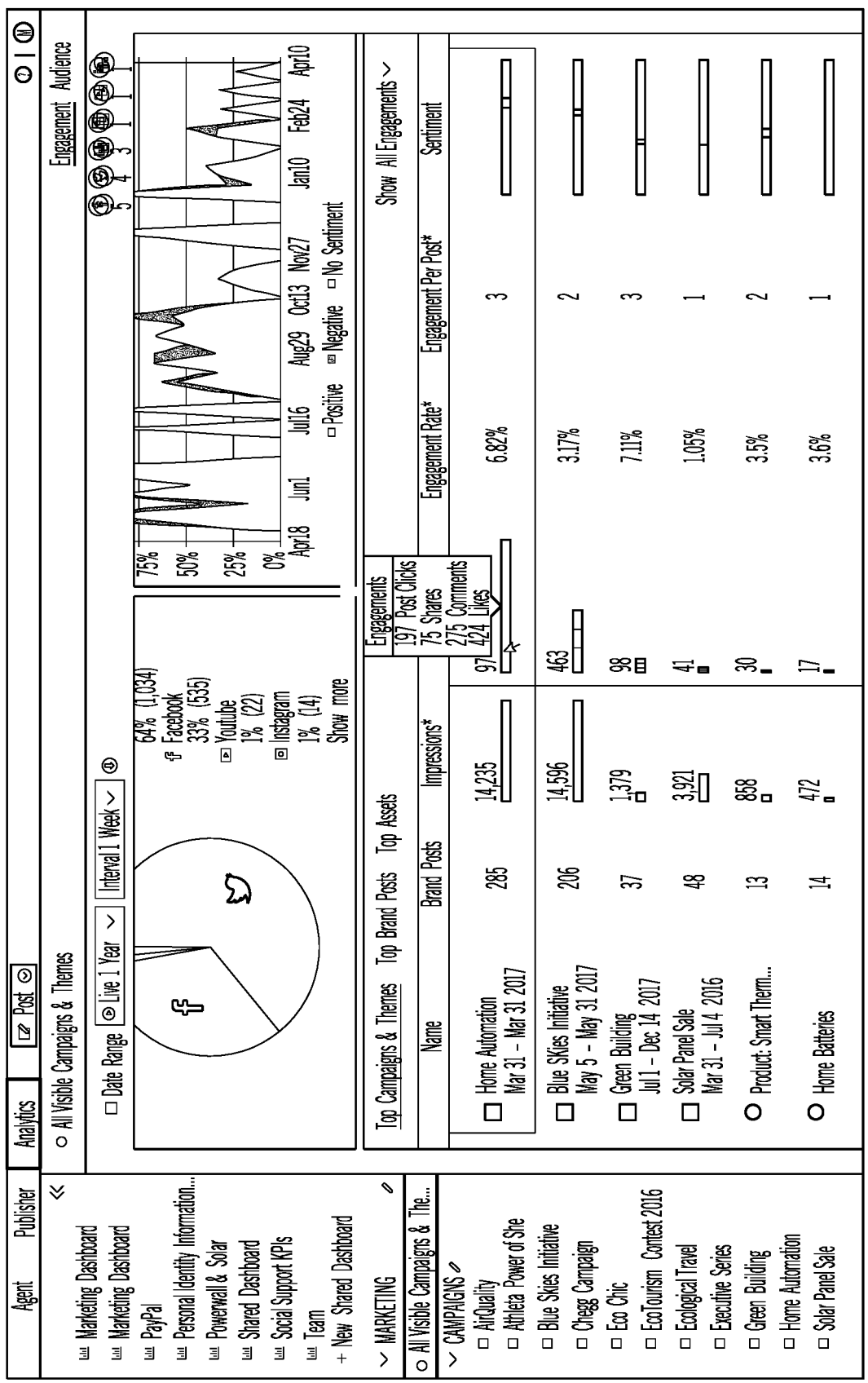

FIG. 12 is similar to FIG. 11 except that it illustrates a menu for selecting a day part for posting. FIG. 13 depicts a page of metrics subsequent to posting. The metrics produced provide information of interest to the user including number of engagements (reactions/actions) etc. to a particular posted content item.

The servers described in this disclosure as well as the clients typically includes at least one processor and system memory (e.g., volatile—RAM or nonvolatile—Flash or ROM). System memory may include computer readable media that is accessible to the processor. The memory may also include instructions for processor, an operating system and one or more application platforms such as Java and a part of software modules or one or more software applications (i.e., steps) and/or modules. The computer will include one or more communication connections such as network interfaces to enable the computer to communication with other computers over a network, storage such as a hard drives for storing data and other software described above, video cards and other conventional components known to those skilled in the art. This computer typically runs Unix or Linux or Microsoft Windows or Macintosh OSX or other as the operating system and includes the TCP/IP protocol stack (to communicate) for communication over the Internet as known to those skilled in the art. A display is optionally used. The server typically includes TCP/IP protocol stack (to communicate) for communication over the Internet as known to those skilled in the art. Program data is also stored within computer server. The content providers also include a web server along with other servers hosted by the content provider as known by those skilled in the art. The content providers also include a web server along with other servers hosted by the content provider as known by those skilled in the art.

It is to be understood that the disclosure teaches examples of the illustrative embodiments and that many variations of the invention can easily be devised by those skilled in the art after reading this disclosure and that the scope of the present invention is to be determined by the claim(s) below.

The invention claimed is:

1. A method comprising:
receiving a request for an interval of time during which to post a content item on a social network in a plurality of social networks, the interval of time being divided into a first subset of units of time;
executing instructions at the one or more servers to redefine the interval of time to include a second subset of units of time;
calculating the schedule for posting a content item on the social network and the post-to-reaction filter based on the second subset of units of time;
modeling a decay function as a function of the post-to-reaction filter, the decay function representative of a level of interest of an audience of the user;
determining an optimal time to post the content item on the social network as a function of the decay function;
recomputing the schedule as a function of the decay function and received schedule for posting the content item on the social network; and
auto-scheduling the posting of the content item to automatically post the content item based on the decay function, wherein auto-scheduling includes one or more of estimating data values representing audience reaction and data values representing domain specific schedule personalization.

2. The method of claim 1, wherein the units of time each is a bucket.

3. The method of claim 1, wherein the executing instructions to redefine the interval of time to include the second subset of units of time comprises:
redefining the interval of time with greater granularity.

4. The method of claim 1, wherein modeling the decay function comprises:
executing instructions to predict a weighted value of the post-to-reaction filter.

5. The method of claim 1, further comprising:
executing instructions to use the post-to-reaction filter to calculate a delayed reaction profile.

6. The method of claim 1, further comprising:
estimating a transformation function based on post-to-reaction filter data generated at the post-to-reaction filter to transform the schedule for posting the content item to the social network into another schedule for posting the content item to another social network.

7. The method of claim 1, wherein receiving the request for the interval of time during which the content item is posted comprises:
receiving the request to post multiple content items.

8. The method of claim 1, further comprising:
determining another optimal time to post a second content item on the social network as a function of the decay function; and
recomputing the schedule as a function of the decay function and received schedule for posting the second content item on the social network.

9. The method of claim 8, further comprising:
repeating determining yet another optimal time to post a third content item on the social network as a function of the decay function; and
recomputing the schedule as a function of the decay function and received schedule for posting the content item and the second content item on the social network.

10. The method of claim 1, further comprising:
providing a platform for managing a campaign for publishing multiple content items on the social network to increase reactions to published content.

11. The method of claim 1, wherein identifying the post-to-reaction filter comprises:
implementing the post-to-reaction filter as a function of a domain.

12. The method of claim 11, further comprising:
executing instructions to compute a domain reaction profile.

13. The method of claim 11, wherein the domain includes one or more of a topic, a time zone, a geo-location based item, a city, a state, a country, and a language.

14. The method of claim 1, further comprising:
estimating the post to a reaction filter for the time interval for the social network for the user, the post to a reaction filter including data representative of a probability distribution that a reaction to a posted content is predicted to occur within the time interval.

15. The method of claim 1, further comprising:
analyzing data representing content associated with the social network to generate a graph;
applying a machine learning model trained to determine a weight for a feature of the data representing content; and
transmitting a signal to a content items database to retrieve a file.

16. An apparatus comprising:
a processor; and
a memory that includes instructions which, when executed by the processor, cause the processor to:
receive a request for an interval of time during which to post a content item on a social network in a plurality of social networks, the interval of time being divided into a first subset of units of time;
identify a schedule for posting a content item and a post-to-reaction filter for the interval of time;
execute instructions to redefine the interval of time to include a second subset of units of time;
calculate the schedule for posting a content item on the social network and the post-to-reaction filter based on the second subset of units of time;
model a decay function as a function of the post-to-reaction filter, the decay function representative of a level of interest of an audience of the user;
determine an optimal time to post the content item on the social network as a function of the decay function;
recompute the schedule as a function of the decay function and received schedule for posting the content item on the social network; and
auto-schedule the posting of the content item to automatically post the content item based on the decay function, wherein the processor configured to auto-schedule is further configured to perform one or more of estimating data values representing audience reaction and data values representing domain specific schedule personalization.

17. The apparatus of claim 16, wherein the units of time each is a bucket.

18. The apparatus of claim 16, wherein the processor is further configured to:
redefine the interval of time with greater granularity.

19. The apparatus of claim 16, wherein the processor is further configured to:
predict a weighted value of the post-to-reaction filter.

20. The apparatus of claim 16, wherein the processor is further configured to:
use the post-to-reaction filter to calculate a delayed reaction profile.

* * * * *